(12) United States Patent
Sohn et al.

(10) Patent No.: US 11,314,993 B2
(45) Date of Patent: Apr. 26, 2022

(54) ACTION RECOGNITION SYSTEM FOR ACTION RECOGNITION IN UNLABELED VIDEOS WITH DOMAIN ADVERSARIAL LEARNING AND KNOWLEDGE DISTILLATION

(71) Applicant: NEC CORPORATION, Tokyo (JP)

(72) Inventors: Kihyuk Sohn, Fremont, CA (US); Xiang Yu, Mountain View, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 1117 days.

(21) Appl. No.: 15/890,005

(22) Filed: Feb. 6, 2018

(65) Prior Publication Data

US 2018/0268222 A1 Sep. 20, 2018

Related U.S. Application Data

(60) Provisional application No. 62/472,896, filed on Mar. 17, 2017.

(51) Int. Cl.
*G06K 9/66* (2006.01)
*G06K 9/00* (2006.01)
(Continued)

(52) U.S. Cl.
CPC ........... *G06K 9/66* (2013.01); *G06K 9/00268* (2013.01); *G06K 9/00288* (2013.01);
(Continued)

(58) Field of Classification Search
CPC ........ G06N 20/00; G06N 20/10; G06N 20/20; G06N 3/02; G06N 3/0454; G06N 3/08;
(Continued)

(56) References Cited

U.S. PATENT DOCUMENTS

2017/0278135 A1\* 9/2017 Majumdar ......... G06K 9/00362
2018/0114068 A1\* 4/2018 Balasundaram ........ G06T 7/143

OTHER PUBLICATIONS

Ding, et al., "Trunk-Branch Ensemble Convolutional Neural Networks for Video-based Face Recognition", IEEE Transactions on Pattern Analysis and Machine Intelligence, May 2017, pp. 1-14.
(Continued)

*Primary Examiner* — Shane D Woolwine
(74) *Attorney, Agent, or Firm* — Joseph Kolodka

(57) ABSTRACT

An action recognition system is provided that includes a device configured to capture a video sequence formed from a set of unlabeled testing video frames. The system further includes a processor configured to pre-train a recognition engine formed from a reference set of CNNs on a still image domain that includes labeled training still image frames. The processor adapts the recognition engine to a video domain to form an adapted engine, by applying non-reference CNNs to domains that include the still image and video domains and a degraded image domain that includes labeled synthetically degraded versions of the frames in the still image domain. The video domain includes random unlabeled training video frames. The processor recognizes, using the adapted engine, an action performed by at least one object in the sequence, and controls a device to perform a response action in response to an action type of the action.

20 Claims, 16 Drawing Sheets

(51) Int. Cl.
| | |
|---|---|
| *G06N 3/08* | (2006.01) |
| *G06N 20/00* | (2019.01) |
| *G06K 9/62* | (2006.01) |
| *G06N 3/04* | (2006.01) |
| *G08B 13/196* | (2006.01) |
| *G06T 7/70* | (2017.01) |
| *G06T 9/00* | (2006.01) |
| *G06K 9/46* | (2006.01) |
| *G06N 3/02* | (2006.01) |

(52) U.S. Cl.
CPC ..... *G06K 9/00718* (2013.01); *G06K 9/00744* (2013.01); *G06K 9/00771* (2013.01); *G06K 9/4628* (2013.01); *G06K 9/6201* (2013.01); *G06K 9/6217* (2013.01); *G06K 9/6262* (2013.01); *G06K 9/6274* (2013.01); *G06N 3/02* (2013.01); *G06N 3/0454* (2013.01); *G06N 3/08* (2013.01); *G06N 3/088* (2013.01); *G06N 20/00* (2019.01); *G06T 7/70* (2017.01); *G06T 9/002* (2013.01); *G08B 13/19613* (2013.01); *G06K 2009/00738* (2013.01); *G06T 2207/20081* (2013.01); *G08B 13/196* (2013.01)

(58) Field of Classification Search
CPC ...... G06N 3/088; G06K 9/66; G06K 9/00268; G06K 9/00288; G06K 9/00718; G06K 9/00744; G06K 9/00771; G06K 9/4628; G06K 9/6201; G06K 9/6271; G06K 9/6262; G06K 9/6274
See application file for complete search history.

(56) References Cited

OTHER PUBLICATIONS

Ganin, et al., "Unsupervised Domain Adaptation by Backpropagation", Proceedings of the 32nd International Conference on Machine Learning, Jul. 2015, 10 pages.

Schroff, et al., "FaceNet: A Unified Embedding for Face Recognition and Clustering", arXiv:1503.03832v3 [cs.CV] Jun. 17, 2015, 10 pages.

* cited by examiner

ACTION RECOGNITION SYSTEM FOR ACTION RECOGNITION IN UNLABELED VIDEOS WITH DOMAIN ADVERSARIAL LEARNING AND KNOWLEDGE DISTILLATION

RELATED APPLICATION INFORMATION

This application claims priority to provisional application Ser. No. 62/472,896, filed on Mar. 17, 2017, incorporated herein by reference. This application is related to an application entitled "Recognition In Unlabeled Videos With Domain Adversarial Learning and Knowledge Distillation", having Ser. No. 15/889,846, and which is incorporated by reference herein in its entirety. This application is related to an application entitled "Face Recognition System For Face Recognition In Unlabeled Videos With Domain Adversarial Learning And Knowledge Distillation", having Ser. No. 15/889,913, and which is incorporated by reference herein in its entirety. This application is related to an application entitled "Surveillance System For Recognition In Unlabeled Videos With Domain Adversarial Learning And Knowledge Distillation", having Ser. No. 15/889,958, and which is incorporated by reference herein in its entirety.

BACKGROUND

Technical Field

The present invention relates to video recognition, and more particularly to an action recognition system for action recognition in unlabeled videos with domain adversarial learning and knowledge distillation.

Description of the Related Art

In machine learning, there exists the fundamental problem of domain adaptation when the source domain has abundant labeled training data and the target domain has no or little labeled training data but a massive amount of unlabeled data.

Accordingly, there is a need for a solution to the aforementioned problem relating to unlabeled data.

SUMMARY

According to an aspect of the present invention, an action recognition system is provided. The action recognition system includes a video capture device configured to capture a video sequence formed from a set of unlabeled testing video frames. The video sequence including one or more objects. The action recognition system further includes a processor. The processor is configured to pre-train a recognition engine formed from a reference set of convolutional neural networks (CNNs) on a still image domain that includes a set of labeled training still image frames. The processor is further configured to adapt the recognition engine to a video domain to form an adapted recognition engine, by applying a non-reference set of CNNs to a set of domains that include the still image domain, a synthetically degraded image domain, and the video domain. The synthetically degraded image domain includes labeled synthetically degraded versions of the labeled training still image frames included in the still image domain. The video domain includes random unlabeled training video frames. The processor is also configured to recognize, using the adapted recognition engine, an action performed by at least one of the objects in the video sequence to obtain a set of recognized actions. The processor is further configured to control a hardware device to perform a response action in response to an identification of an action type of an action performed by the at least one object. The identification of the action type is based on the set of recognized actions.

According to another aspect of the present invention, a computer-implemented method is provided for action recognition. The method includes capturing, by a video capture device, a video sequence formed from a set of unlabeled testing video frames. The video sequence includes one or more objects. The method further includes pre-training, by a processor, a recognition engine formed from a reference set of convolutional neural networks (CNNs) on a still image domain that includes a set of labeled training still image frames. The method also includes adapting, by the processor, the recognition engine to a video domain to form an adapted recognition engine, by applying a non-reference set of CNNs to a set of domains that include the still image domain, a synthetically degraded image domain, and the video domain. The synthetically degraded image domain includes labeled synthetically degraded versions of the labeled training still image frames included in the still image domain. The video domain includes random unlabeled training video frames. The method additionally includes recognizing, by the processor using the adapted recognition engine, an action performed by at least one of the objects in the video sequence to obtain a set of recognized actions. The processor further includes controlling, by the processor, a hardware device to perform a response action in response to an identification of an action type of an action performed by the at least one object. The identification of the action type is based on the set of recognized actions.

According to yet another aspect of the present invention, a computer program product is provided for action recognition. The computer program product includes a non-transitory computer readable storage medium having program instructions embodied therewith. The program instructions are executable by a computer to cause the computer to perform a method. The method includes capturing, by a video capture device, a video sequence formed from a set of unlabeled testing video frames. The video sequence includes one or more objects. The method further includes pre-training, by a processor, a recognition engine formed from a reference set of convolutional neural networks (CNNs) on a still image domain that includes a set of labeled training still image frames. The method also includes adapting, by the processor, the recognition engine to a video domain to form an adapted recognition engine, by applying a non-reference set of CNNs to a set of domains that include the still image domain, a synthetically degraded image domain, and the video domain. The synthetically degraded image domain includes labeled synthetically degraded versions of the labeled training still image frames included in the still image domain. The video domain includes random unlabeled training video frames. The method additionally includes recognizing, by the processor using the adapted recognition engine, an action performed by at least one of the objects in the video sequence to obtain a set of recognized actions. The method further includes controlling, by the processor, a hardware device to perform a response action in response to an identification of an action type of an action performed by the at least one object. The identification of the action type is based on the set of recognized actions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to action recognition system for action recognition in unlabeled videos with domain adversarial learning and knowledge distillation.

In an embodiment, the present invention solves the fundamental machine learning problem of domain adaptation where the source domain has abundant labeled training data and the target domain has no or only a few numbers of labeled training data but a massive amount of unlabeled data.

In an embodiment, the present invention utilizes unlabeled video data to train a recognition engine together with labeled image data.

In an embodiment, the present invention is applied to video face recognition. Of course, the present invention is not limited to solely video face recognition and can be applied to other types of recognition, as readily appreciated by one of ordinary skill in the art given the teachings of the present invention provided herein, while maintaining the spirit of the present invention.

In an embodiment, the present invention can provide and/or otherwise involve one or more of the following:

(a) a new training framework for deep metric learning with labeled data from a source domain and unlabeled data from a target domain;

(b) a synthetically blurred image domain to bridge the gap between the two aforementioned domains (that is, the image domain and the video domain);

(c) a series of training objectives, such as, for example, feature matching loss, and feature restoration loss, classification loss, as well as adversarial loss, to train our network; and (d) a proposed training framework that allows a recognition engine to have better generalization ability to the target domain.

It is to be appreciated that recognition in unlabeled videos in accordance with the present invention can be applied to applications including, but not limited to, any of the following: face recognition; surveillance; action recognition; and so forth. Of course, the present invention can also be applied to a myriad of other applications, as readily appreciated by one of ordinary skill in the art given the teachings of the present invention provided herein, while maintaining the spirit of the present invention.

Figure 1:
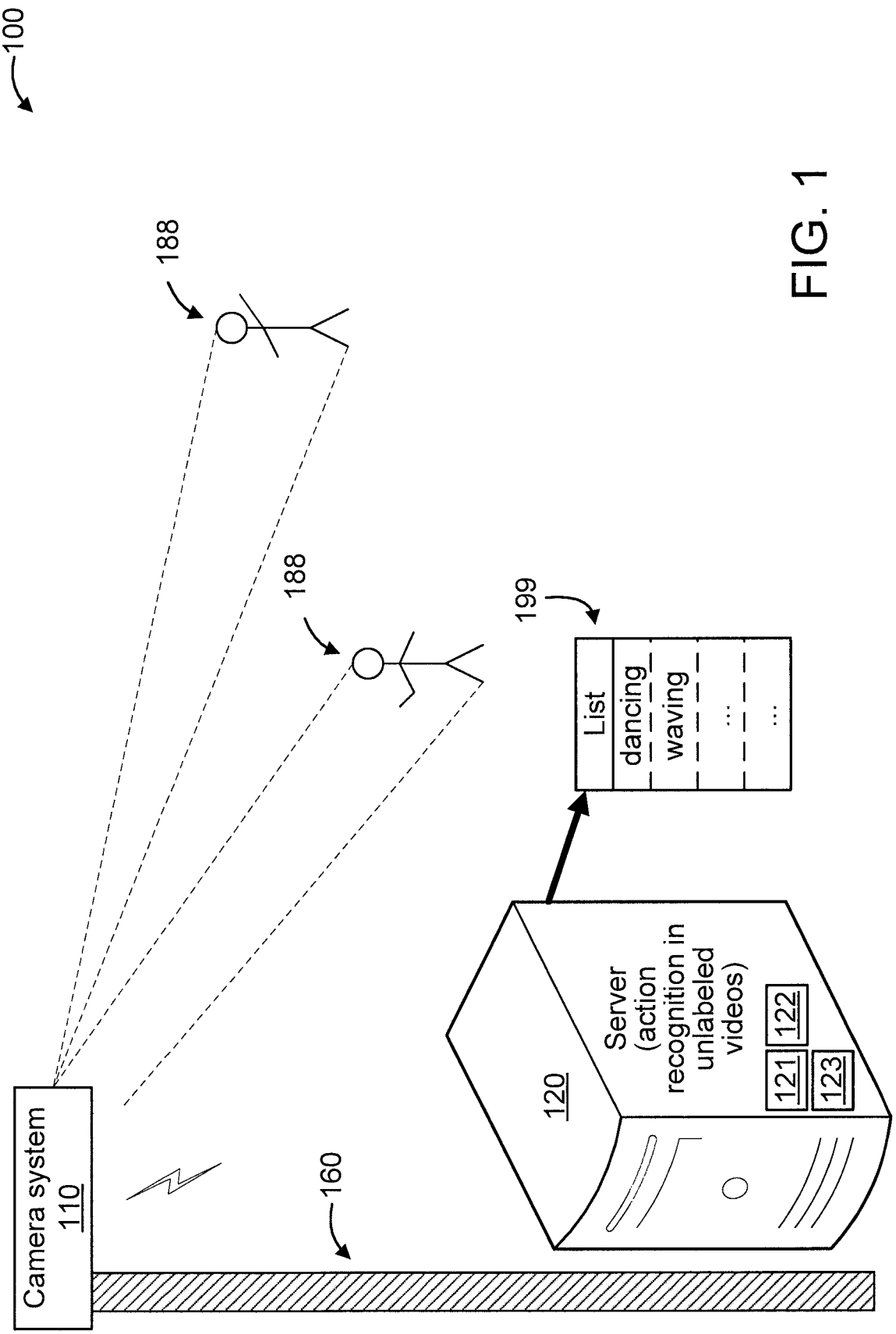
FIG. 1 shows an exemplary system for action recognition in unlabeled videos with domain adversarial learning and knowledge distillation, in accordance with an embodiment of the present invention.

FIG. 1 shows an exemplary system 100 for action recognition in unlabeled videos with domain adversarial learning and knowledge distillation, in accordance with an embodiment of the present invention.

The system 100 includes a camera system 110. While a single camera system 110 is shown in FIG. 1 for the sakes of illustration and brevity, it is to be appreciated that multiple camera systems can be also used, while maintaining the spirit of the present invention.

In the embodiment of FIG. 1, the camera system 110 is mounted on a mounting entity 160. For the sake of illustration, the mounting entity 160 is a pole. While a pole 160 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 110 can be mounted in or on any of the following: a building; and so forth. The preceding examples are merely illustrative.

The camera system 110 can be a wireless camera system having its own antenna(s) or can use one or more antennas included on the pole 160 (or other mounting entity (e.g., building, drone, etc.) to which the camera system 110 is mounted or proximate).

The system 100 further includes a server 120 configured to perform action recognition in unlabeled videos. Such action recognition can be with respect to a secured object such as, for example, a facility 177. The facility can be a secured facility or a non-secured facility. In the example of FIG. 1, the facility is a secured facility implemented as an airport. Of course, other facilities (e.g., mass transit hub, sports complex, etc.) can also be monitored with respect to action recognition in unlabeled videos in accordance with the present invention. The action recognition can involve detecting the presence of objects 188 (e.g., persons), recognizing particular actions performed by the objects 188 and/or particular actions performed by one or more persons using the objects 188, and/or performing one or more actions (e.g., in response to action recognition results). The server 120 can be located remote from, or proximate to, the camera system 110. The server 120 can include a processor 121, a memory 122, and a wireless transceiver 423. The processor 121 and the memory 122 of the remote server 120 can be configured to perform surveillance based on images received from the camera system 110 by the (the wireless transceiver 123 of) the remote server 120. In this way, a list 199 of recognized actions can be provided for any of a myriad of possible application uses relating to action recognition. Such application uses can involve one or more actions performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth.

Accordingly, some exemplary suitable environments to which the present invention can be applied can include any environments where action recognition can prove useful such as mass transit hubs, border crossings, subways, transportation hubs, airports, ship ports, sports facilities, and so forth. It is to be appreciated that the preceding environments are merely illustrative and, thus, other environments can also be used, while maintaining the spirit of the present invention.

Any action type of interest can be recognized, depending upon the implementation. For example, the action may include, but is not limited to, one or more of the following: an intruder running up to a premises or an object; a projectile approaching the premises or the object; a sporting action; a prohibited action (e.g., holding a weapon in a place where weapons are prohibited except for, e.g., law enforcement, etc.); a potentially dangerous action; and so forth. It is to be appreciated that the preceding actions are merely illustrative.

Figure 2:
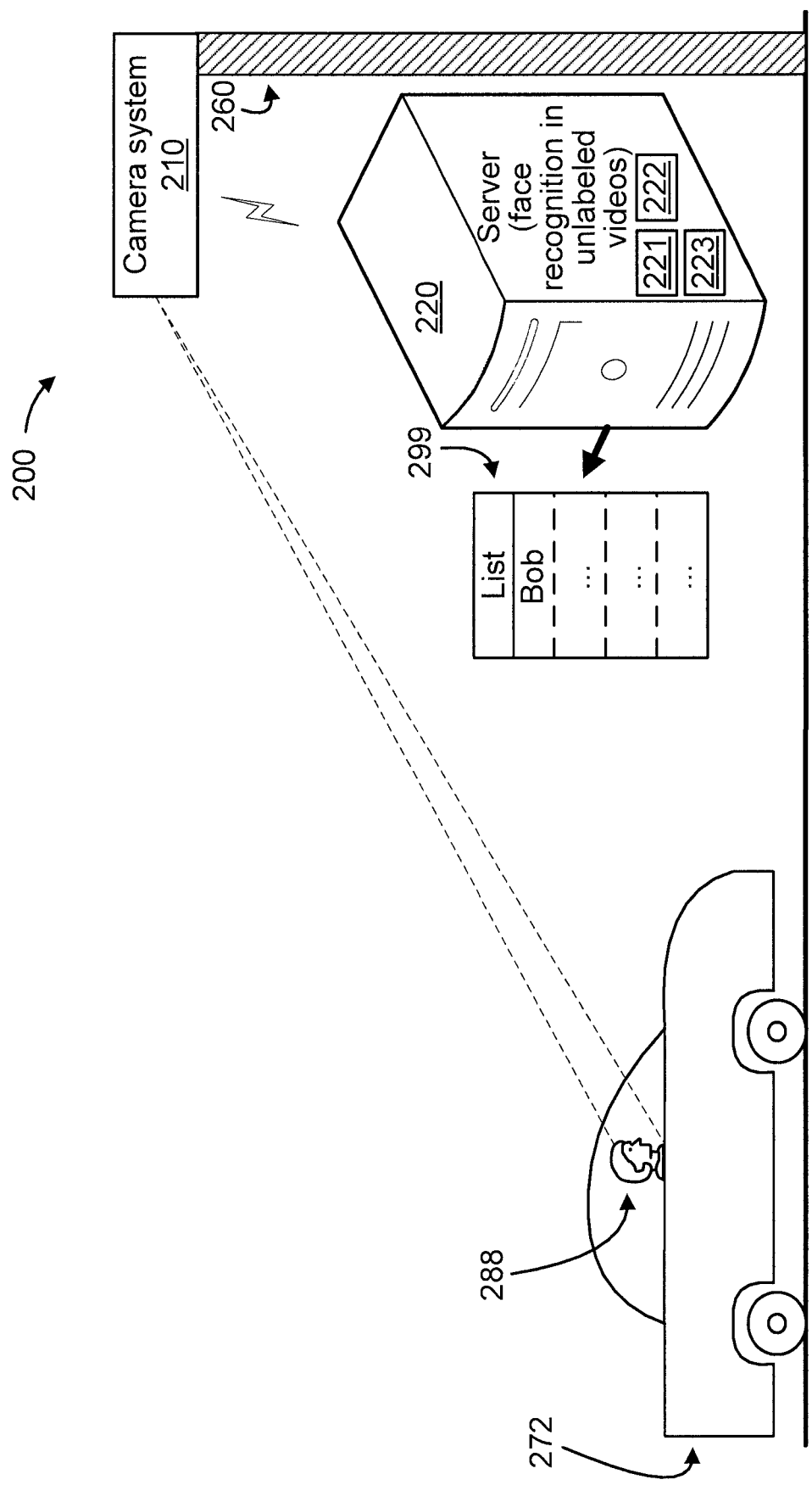
FIG. 2 shows an exemplary system for face recognition in unlabeled videos with domain adversarial learning and knowledge distillation, in accordance with an embodiment of the present invention.

FIG. 2 shows an exemplary system 200 for face recognition in unlabeled videos with domain adversarial learning and knowledge distillation, in accordance with an embodiment of the present invention.

The system 200 includes a camera system 210. While a single camera system 210 is shown in FIG. 2 for the sakes of illustration and brevity, it is to be appreciated that multiple camera systems can be also used, while maintaining the spirit of the present invention.

In the embodiment of FIG. 2, the camera system 210 is mounted on a mounting entity 260. For the sake of illustration, the mounting entity 260 is a pole. While a pole 260 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 210 can be mounted in or on any of the following: a building; a drone; a vehicle; and so forth. The preceding examples are merely illustrative.

The camera system 210 can be a wireless camera system having its own antenna(s) or can use one or more antennas included on the pole 260 (or other mounting entity (e.g., building, drone, vehicle, etc.) to which the camera system 210 is mounted or proximate).

The system 200 further includes a server 220 configured to perform face recognition in unlabeled videos. The face recognition can involve recognizing a person 288 using face recognition. In the embodiment of FIG. 2, the person 288 is located in a motor vehicle 272. The face recognition can further involve performing one or more actions (e.g., in response to particular face recognition results). The server 220 can located remote from, or proximate to, the camera system 210. The server 220 can include, e.g., a processor 221, a memory 222, and a wireless transceiver 223. The processor 221 and the memory 222 of the remove server 220 can be configured to perform face recognition based on images received from the camera system 210 by the (the wireless transceiver 223 of) the remote server 220. In this way, a list 299 of recognized persons can be provided for any of a myriad of possible application uses relating to face recognition. Such application uses can involve one or more actions performed responsive to the list, as readily appreciated by one of ordinary skill in the art.

Accordingly, some exemplary suitable environments to which the present invention can be applied can include any environments where face recognition can be used. For example, exemplary suitable environments include, but are not limited to, an environment to be surveilled, a sports or other event, a battle field, a riot scenario, a picketing scenario, video analysis, a mass transit hub, and so forth.

Figure 3:
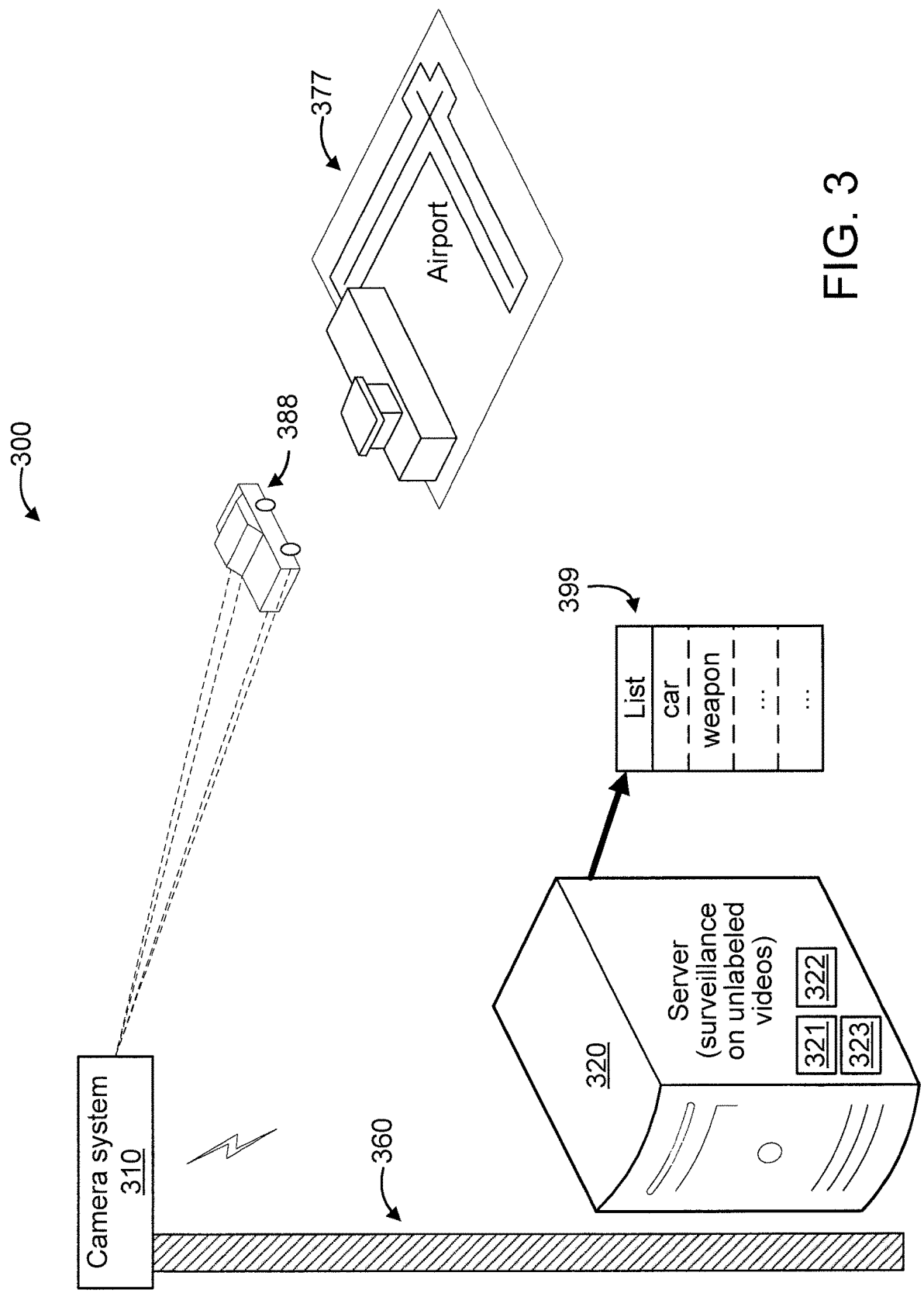
FIG. 3 shows an exemplary system for surveillance based on recognition in unlabeled videos with domain adversarial learning and knowledge distillation, in accordance with an embodiment of the present principles.

FIG. 3 shows an exemplary system 300 for surveillance based on recognition in unlabeled videos with domain adversarial learning and knowledge distillation, in accordance with an embodiment of the present principles.

The system 300 includes a camera system 310. While a single camera system 310 is shown in FIG. 3 for the sakes of illustration and brevity, it is to be appreciated that multiple camera systems can be also used, while maintaining the spirit of the present invention.

In the embodiment of FIG. 3, the camera system 310 is mounted on a mounting entity 360. For the sake of illustration, the mounting entity 360 is a pole. While a pole 360 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 310 can be mounted in or on any of the following: a building; and so forth. The preceding examples are merely illustrative.

The camera system 310 can be a wireless camera system having its own antenna(s) or can use one or more antennas included on the pole 360 (or other mounting entity (e.g., building, drone, etc.) to which the camera system 310 is mounted or proximate).

The system 300 further includes a server 320 configured to perform surveillance based on object recognition in unlabeled videos. Such surveillance can be with respect to a secured object such as, for example, a secured facility 377. Such surveillance can be with respect to an object at the secured facility 377, such as a car 388. In the example of FIG. 3, the secured facility is an airport. Of course, other secured facilities can also be surveilled in accordance with the present invention. The surveillance can involve detecting the presence of objects, recognizing the objects, identifying particular actions performed by the objects, and/or performing one or more actions (e.g., in response to object recognition/surveillance results). The server 320 can be located remote from, or proximate to, the camera system 310. The server 320 can include a processor 321, a memory 322, and a wireless transceiver 323. The processor 321 and the memory 322 of the remote server 320 can be configured to perform surveillance based on images received from the camera system 310 by the (the wireless transceiver 323 of) the remote server 320. In this way, a list 399 of recognized objects can be provided for any of a myriad of possible surveillance application uses relating to object recognition. Such application uses can involve one or more actions performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth.

Accordingly, some exemplary suitable environments to which the present invention can be applied can include any environments where surveillance can prove useful such as mass transit hubs, border crossings, subways, transportation hubs, airports, ship ports, and so forth. It is to be appreciated that the preceding environments are merely illustrative and, thus, other environments can also be used, while maintaining the spirit of the present invention.

Figure 4:
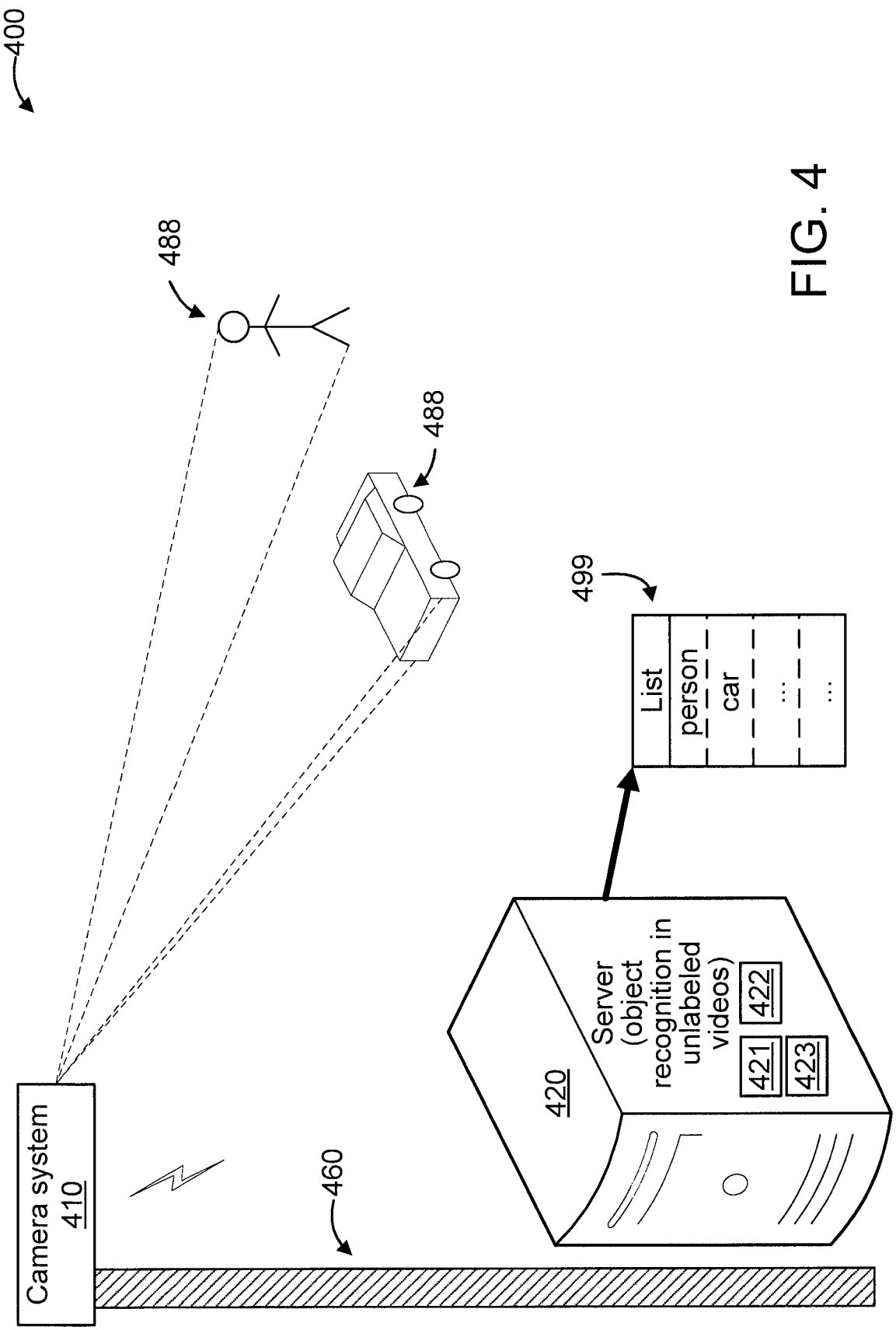
FIG. 4 shows an exemplary system for object recognition in unlabeled videos with domain adversarial learning and knowledge distillation, in accordance with an embodiment of the present invention.

FIG. 4 shows an exemplary system 400 for object recognition in unlabeled videos with domain adversarial learning and knowledge distillation, in accordance with an embodiment of the present invention.

The system 400 includes a camera system 410. While a single camera system 410 is shown in FIG. 4 for the sakes of illustration and brevity, it is to be appreciated that multiple camera systems can be also used, while maintaining the spirit of the present invention.

In the embodiment of FIG. 4, the camera system 410 is mounted on a mounting entity 460. For the sake of illustration, the mounting entity 460 is a pole. While a pole 460 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 410 can be mounted in or on any of the following: a building; a drone; a vehicle; and so forth. The preceding examples are merely illustrative.

The camera system 410 can be a wireless camera system having its own antenna(s) or can use one or more antennas included on the pole 460 (or other mounting entity (e.g., building, drone, vehicle, etc.) to which the camera system 410 is mounted or proximate).

The system 400 further includes a server 420 configured to perform object recognition in unlabeled videos. The object recognition can involve detecting the presence of multiple objects 488, recognizing the multiple objects 188, identifying particular actions performed by the multiple objects 488, and/or performing one or more actions (e.g., in response to particular object recognition results). The server 420 can located remote from, or proximate to, the camera system 410. The server 420 can include, e.g., a processor 421, a memory 422, and a wireless transceiver 423. The processor 421 and the memory 422 of the remove server 420 can be configured to perform object recognition based on images received from the camera system 410 by the (the wireless transceiver 423 of) the remote server 420. In this way, a list 499 of recognized objects can be provided for any of a myriad of possible application uses relating to object recognition. Such application uses can involve one or more actions performed responsive to the list, as readily appreciated by one of ordinary skill in the art.

Accordingly, some exemplary suitable environments to which the present invention can be applied can include any environments where object recognition can be used. For example, exemplary suitable environments include, but are not limited to, an environment to be surveilled, a sports or other event, a battle field, a riot scenario, a picketing scenario, video analysis, a mass transit hub, and so forth.

Figure 5:
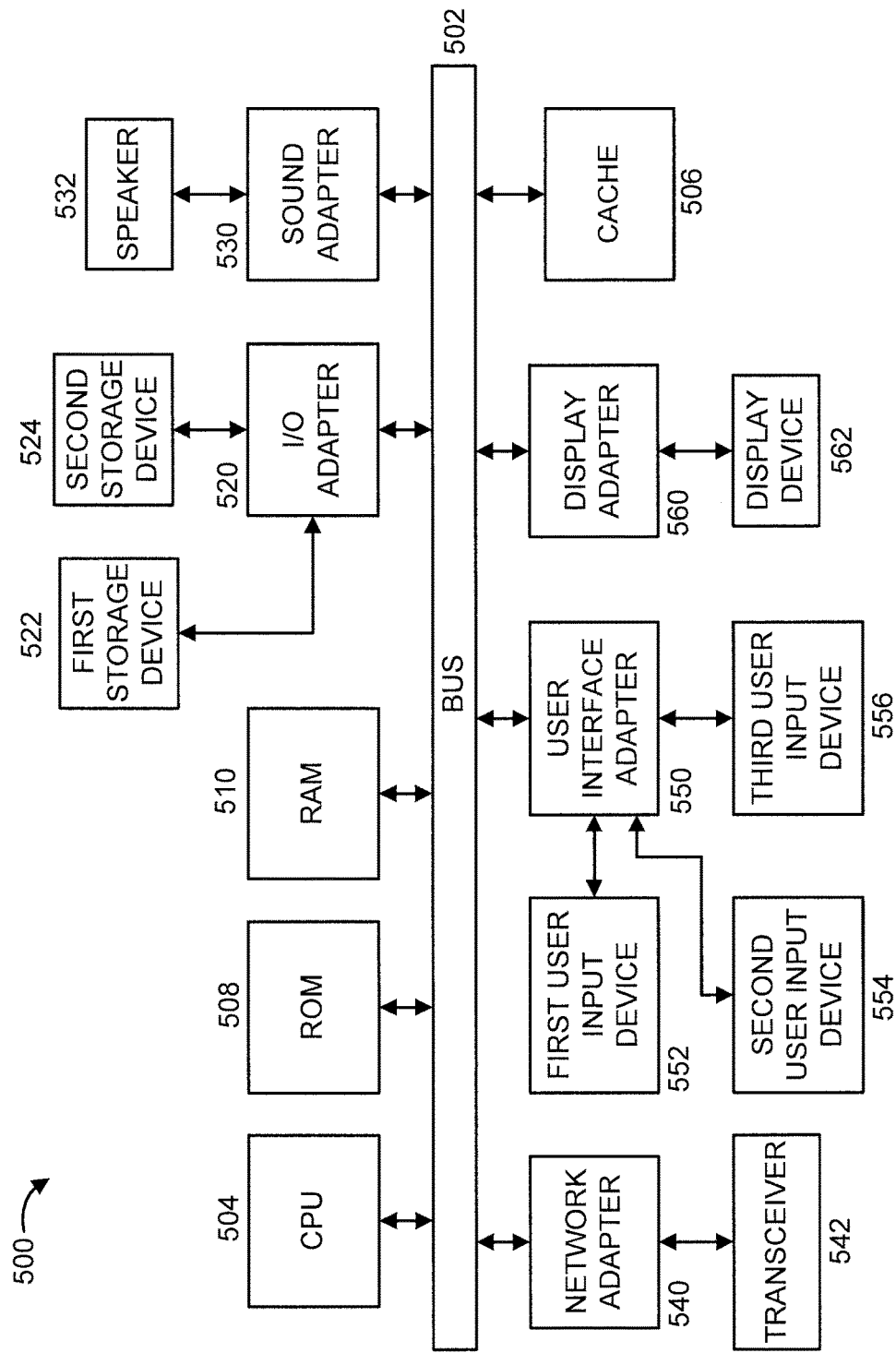
FIG. 5 shows an exemplary processing system to which the present principles may be applied, according to an embodiment of the present principles.

FIG. 5 shows an exemplary processing system 500 to which the present principles may be applied, according to an embodiment of the present principles. In an embodiment, the server 120 of FIG. 1 and/or the server 220 of FIG. 2 and/or the server 320 of FIG. 3 and/or the server 420 of FIG. 4 can be implemented, at least in part, by processing system 500.

The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Moreover, it is to be appreciated that systems 100, 200, 300, and 400 described above with respect to FIGS. 1, 2, 4, and 4, respectively, are systems for implementing respective embodiments of the present principles. Part or all of processing system 500 may be implemented in one or more of the elements of any of systems 100, 200, 300, and 400.

Further, it is to be appreciated that system 500 may perform at least part of the method described herein including, for example, at least part of method 900 of FIGS. 9-14. Similarly, part or all of any of systems 100, 200, 300, and/or 400 may be used to perform at least part of method 900 of FIGS. 9-14.

Figure 6:
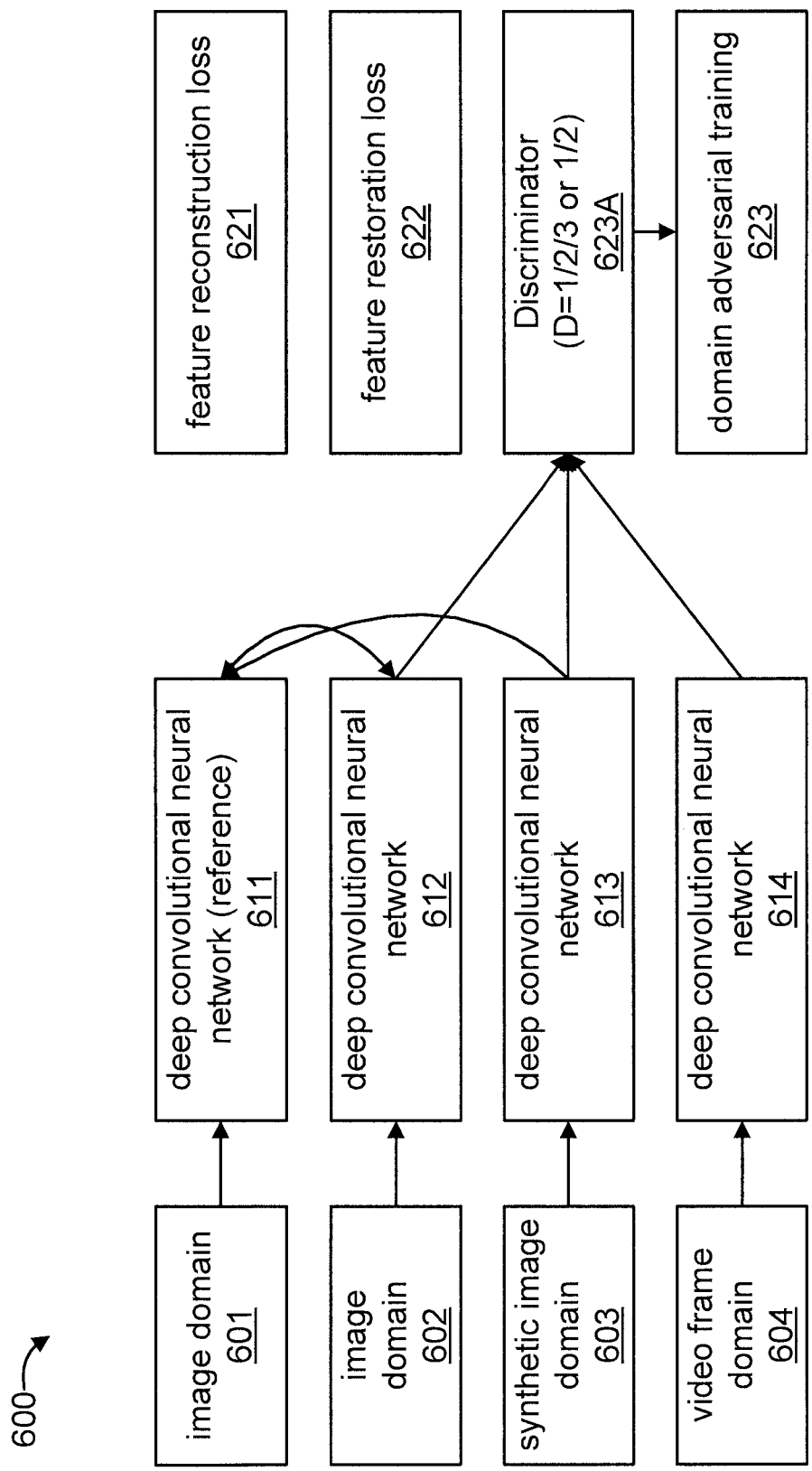
FIG. 6 shows an exemplary training protocol for recognition in unlabeled videos, in accordance with an embodiment of the present invention.

FIG. 6 shows an exemplary training protocol 600 for recognition in unlabeled videos, in accordance with an embodiment of the present invention.

The training protocol 600 includes an image domain 601, an image domain 602, a synthetic image domain 603, and a video frame domain 604.

The image domain 601 includes labeled still images of preferably high quality. The image domain 602 includes original labeled still images and the synthetic image domain 603 includes transformed versions of the original still images in the image domain 602. In an embodiment, the image domain 601 can include domain-specific faces (faces expected in a given domain), while the image domain 602 can include domain non-specific (e.g., random) faces. The video frame domain 604 includes unlabeled video frames.

The training protocol 600 further includes a reference deep Convolutional Neural Network (CNN) 611, a deep CNN 612, a deep CNN 613, and a deep CNN 614.

The image domain 601 is operatively coupled to the reference deep CNN 611. The image domain 602 is operatively coupled to the deep CNN 612. The synthetic image domain 603 is operatively coupled to the deep CNN 613. The video frame domain 604 is operatively coupled to the deep CNN 614.

In an embodiment, the image domain 601 and the reference domain form a reference net or "RFNet" as described in further detail herein. RFNet can be considered to form a pre-trained face recognition engine on a labeled web face database. In an embodiment, the image domain 602, the synthetic image domain 603, the video frame domain 604, the deep CNN 612, the deep CNN 613, and the deep CNN 614 form a video face network or "VDNET". VDNet is trained by distilling discriminative knowledge from RFNet. In an embodiment, RFNet can be exactly the same as the face recognition engine and the parameters can be fixed over the training. VDNet can be initialized the same as RFNet but the parameters are updated for all layers except the last two convolutional layers.

The training protocol 600 also includes a feature reconstruction loss 621, a feature restoration loss 622, and domain-adversarial loss 623.

The feature reconstruction loss 621 is used to maintain the good performance of the network on high-quality images.

The feature restoration loss 622 is used to restore the representation of low-quality images.

The domain-adversarial loss 623 involves a 3-way discriminator 623A. The domain-adversarial loss 623 is used to reduce the differences between three domains, namely, the image domain 602, the synthetically blurred image domain 603, and the video domain 604. Furthermore, the discriminator's confidence score can be used for attention at test time.

Figure 7:
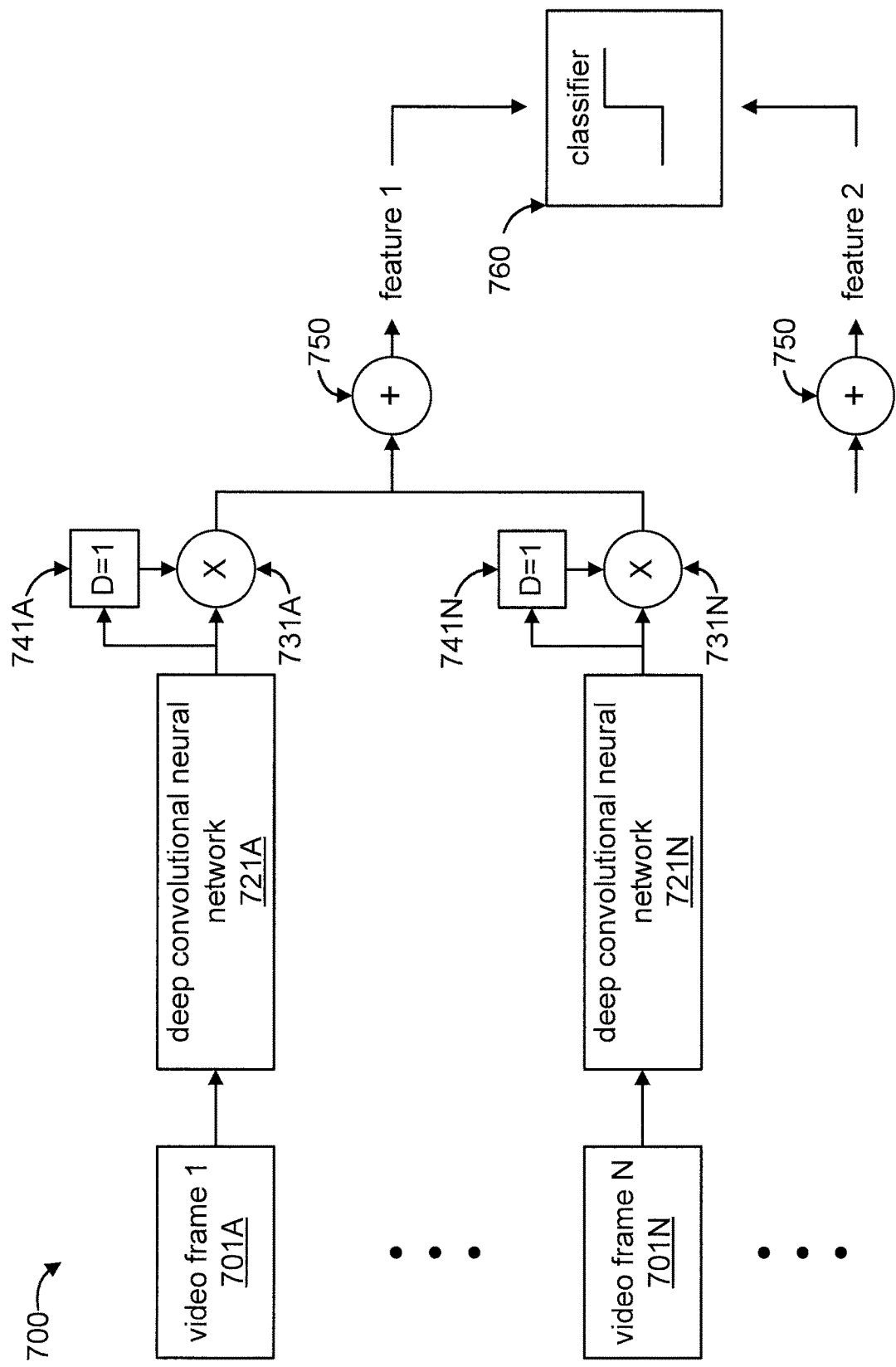
FIG. 7 shows an exemplary testing protocol for face recognition in unlabeled videos, in accordance with an embodiment of the present invention.

FIG. 7 shows an exemplary testing protocol 700 for face recognition in unlabeled videos, in accordance with an embodiment of the present invention.

The testing protocol 700 includes, for each feature, a set of video frames 701A through 701N, a set of deep CNNs 721A through 721N, a set of multipliers 731A through 731N, a set of discriminator outputs 741A through 741N, and a respective summer 750.

Each of the video frames 701A through 701N in the set is operatively coupled to an input of a respective one of the deep CNNs 721A through 721N. The networks 721A through 721N are configured the same with respect to each other. That is, the same network is repeatedly used (with each repeat having its own letter (A through N) after 721) for each frame to be processed in accordance with the present invention.

An output of the each of the deep CNNs 721A through 721N is operatively coupled to an input of a respective one of the multipliers 731A through 731N and to a respective one of the discriminator outputs 741A through 741N that is also provided as an input to a respective one of the multipliers 731A through 731N.

Outputs of the multipliers 731A through 731N are operatively coupled to the respective summer 750 for that feature in order to output a respective feature. The features are used to form a classifier 760.

Figure 8:
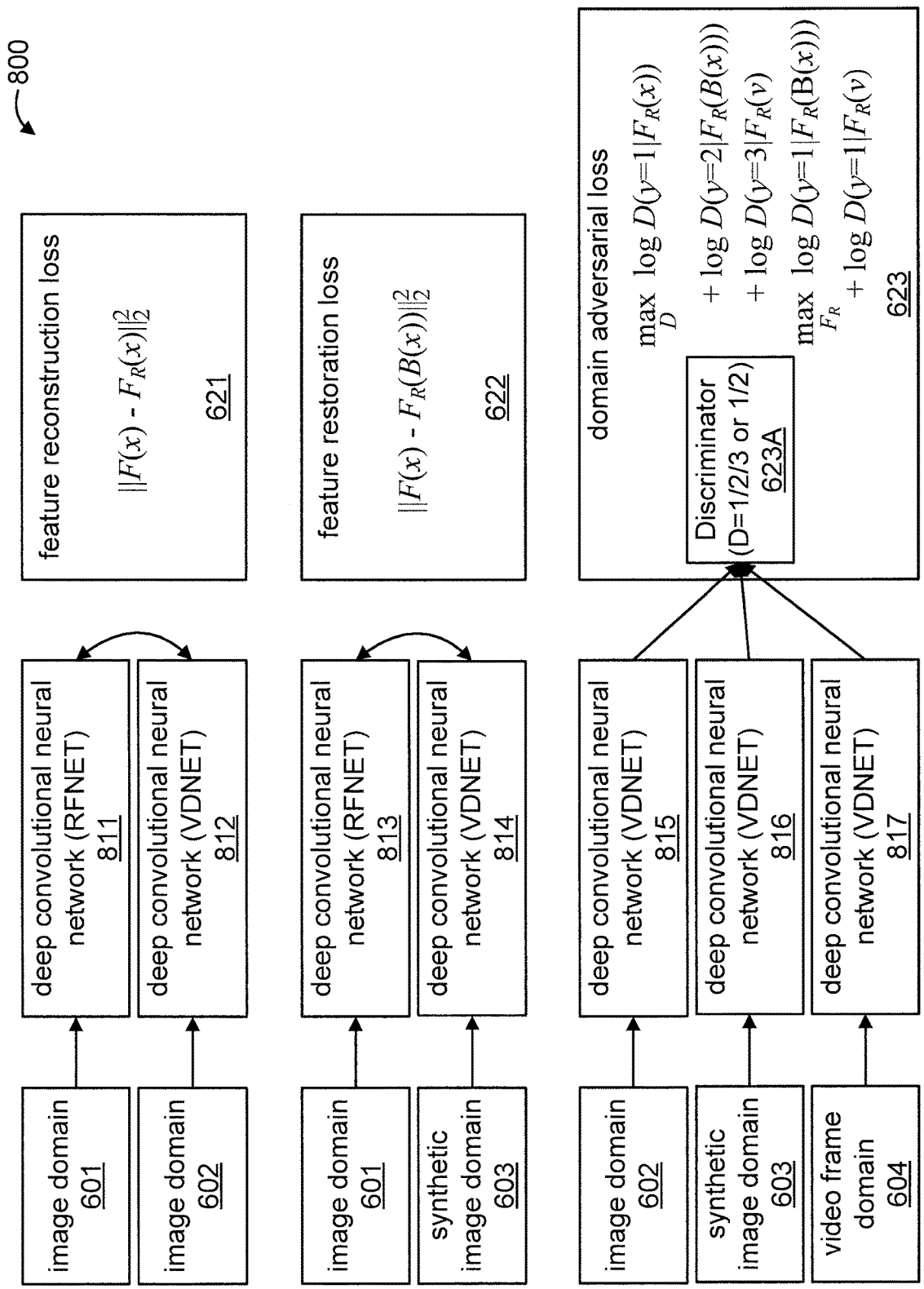
FIG. 8 shows an exemplary training protocol with loss formulation for recognition in unlabeled videos, in accordance with an embodiment of the present invention.

FIG. 8 shows an exemplary training protocol 800 with loss formulation for recognition in unlabeled videos, in accordance with an embodiment of the present invention.

The training protocol 800, similar to FIG. 6, includes an image domain 601, an image domain 602, a synthetic image domain 603, and a video frame domain 604.

The training protocol 800 further includes a reference deep Convolutional Neural Network (CNN) 811, a reference deep CNN 812, a deep CNN 813, a deep CNN 814, a deep CNN 815, a deep CNN 816, and a deep CNN 817. Note that the aforementioned image domains 801-804 are shared by the CNNs 811-817 as described below.

Of the CNNs 811-817, CNNs 811 and 813 are RFNET as described herein, and CNNs 812 and 814-817 are VDNET as described herein. For correlation to FIG. 6, CNNs 811 and 813 of FIG. 8 can correspond to CNN 611 of FIG. 6, CNNs 812 and 815 of FIG. 8 can correspond to CNN 612 of FIG. 6, CNNs 814 and 816 of FIG. 8 can correspond to CNN 613 of FIG. 6, and CNN 817 of FIG. 8 can correspond to CNN 614 of FIG. 6.

The image domain 601 is operatively coupled to the reference deep CNN 611, the reference deep CNN 813, and the deep CNN 815. The image domain 602 is operatively coupled to the deep CNN 812. The synthetic image domain 603 is operatively coupled to the deep CNN 613 and the deep CNN 615. The video frame domain 604 is operatively coupled to the deep CNN 617.

FIGS. 9-14 show an exemplary method 900 for recognition in unlabeled videos with domain adversarial learning and knowledge distillation, in accordance with an embodiment of the present principles.

Figure 9:
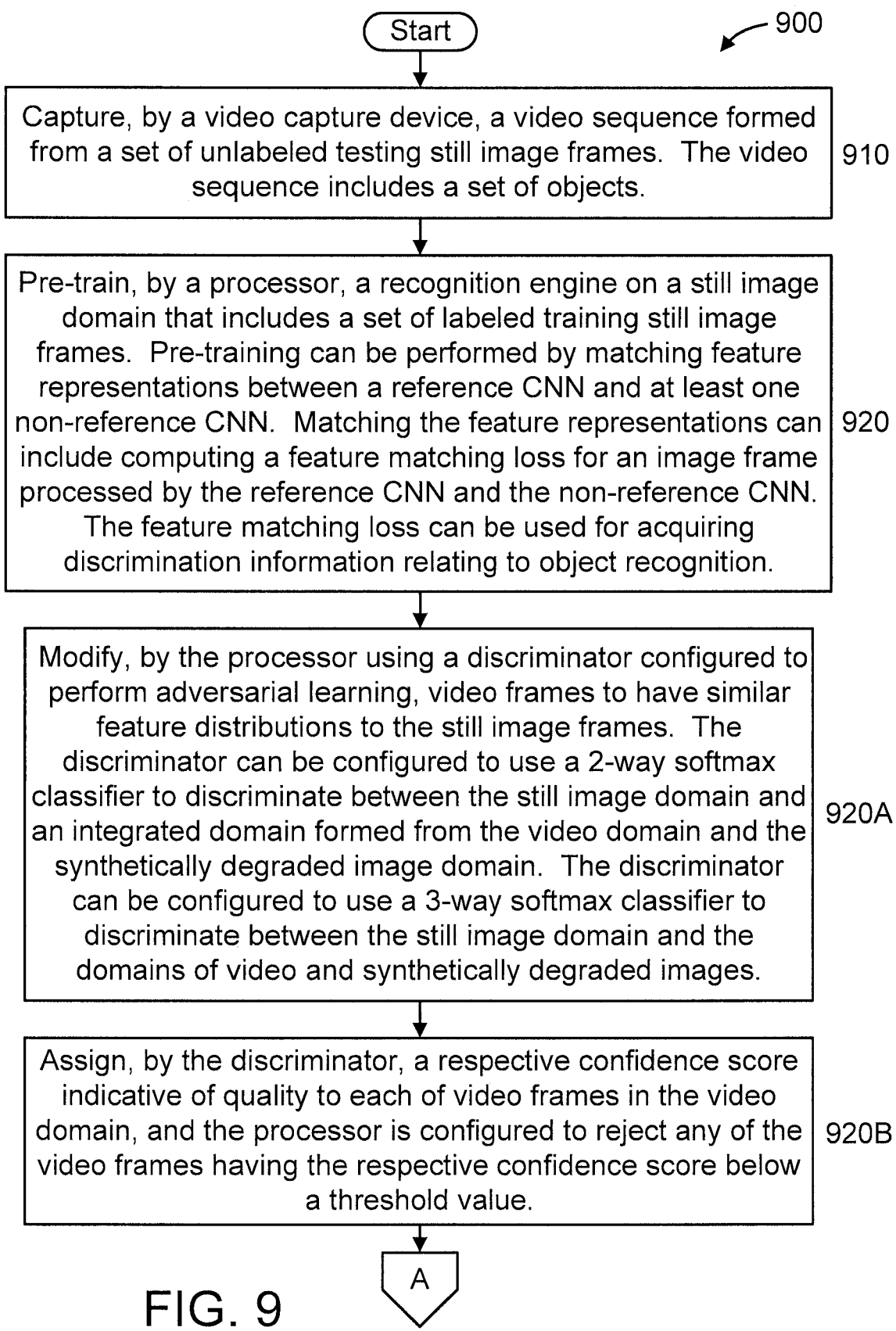
FIGS. 9-14 show an exemplary method for recognition in unlabeled videos with domain adversarial learning and knowledge distillation, in accordance with an embodiment of the present principles.

Referring to FIG. 9, at block 910, capture, by a video capture device, a video sequence formed from a set of unlabeled testing still image frames. The video sequence includes a set of objects.

At block 920, pre-train, by a processor, a recognition engine on a still image domain that includes a set of labeled training still image frames. In an embodiment, pre-training of the recognition engine can be performed by matching feature representations between a reference CNN and at least one non-reference CNN. In an embodiment, matching the feature representations can include computing a feature matching loss for an image frame processed by the reference CNN and the non-reference CNN. The feature matching loss can be used for acquiring discrimination information relating to object recognition.

In an embodiment, block 920 can include one or more of blocks 920A-920C.

At block 920A, modify, by the processor using a discriminator configured to perform adversarial learning, video frames to have similar feature distributions to the still image frames. In an embodiment, the adversarial learning can be performed using an adversarial loss metric. In an embodiment, the discriminator can be configured to use a 2-way softmax classifier to discriminate between the still image domain and an integrated domain formed from the video domain and the synthetically degraded image domain. In another embodiment, the discriminator can be configured to use a 3-way softmax classifier to discriminate between the still image domain and the domains of video and synthetically degraded images.

At block 920B, assign, by the discriminator, a respective confidence score indicative of quality to each of video frames in the video domain, and the processor is configured to reject any of the video frames having the respective confidence score below a threshold value.

Figure 10:
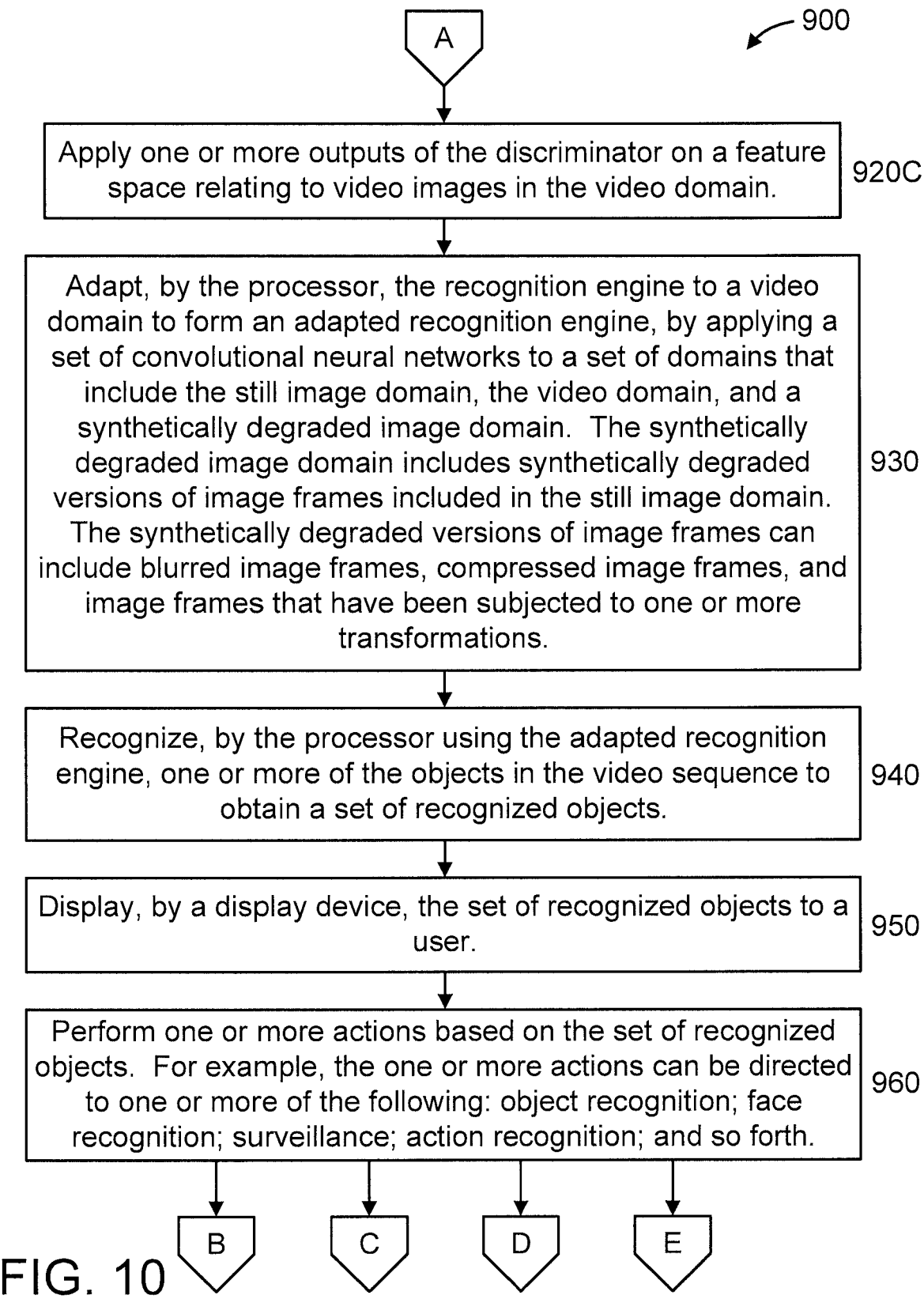

Referring to FIG. 10, at block 920C, apply one or more outputs of the discriminator on a feature space relating to video images in the video domain.

At block 930, adapt, by the processor, the recognition engine to a video domain to form an adapted recognition engine, by applying a set of convolutional neural networks to a set of domains that include the still image domain, the video domain, and a synthetically degraded image domain. The synthetically degraded image domain includes synthetically degraded versions of image frames included in the still image domain. The synthetically degraded versions of image frames can include blurred image frames, compressed image frames, and image frames that have been subjected to one or more transformations.

At block 940, recognize, by the processor using the adapted recognition engine, one or more of the objects in the video sequence to obtain a set of recognized objects.

At block 950, display, by a display device, the set of recognized objects to a user.

At step 960, perform one or more actions based on the set of recognized objects. For example, the one or more actions can be directed to one or more of the following: object recognition; face recognition; surveillance; action recognition; and so forth.

In an embodiment, step 960 can include one or more of steps 960A through 960D.

Figure 11:
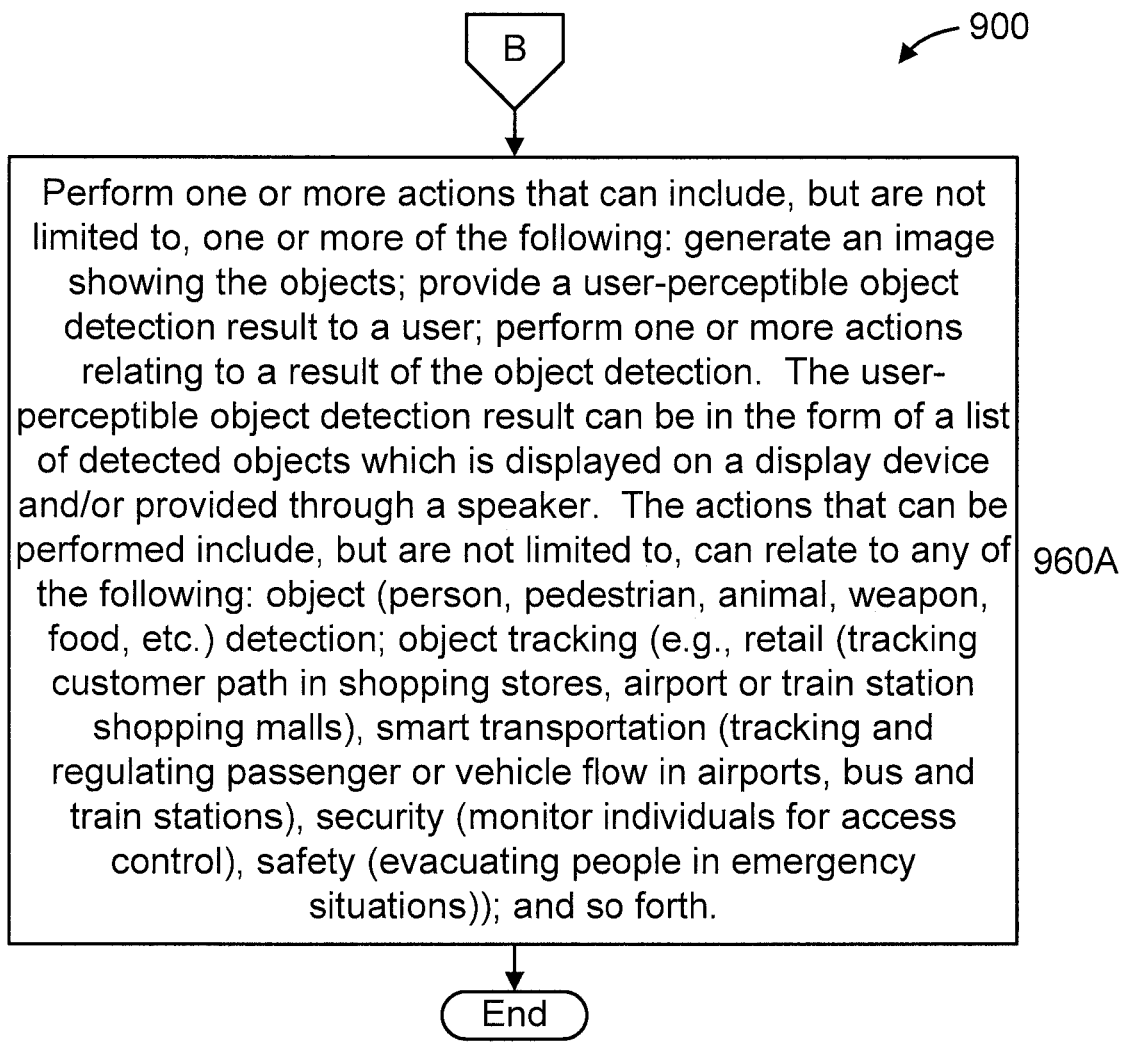

Referring to FIG. 11, at step 960A, corresponding to object detection, perform one or more actions that can include, but are not limited to, one or more of the following: generate an image showing the objects; provide a user-perceptible object detection result to a user; perform one or more actions relating to a result of the object detection. In an embodiment, the user-perceptible object detection result can be in the form of a list of detected objects which is displayed on a display device and/or provided through a speaker. The actions that can be performed include, but are not limited to, can relate to any of the following: object (person, pedestrian, animal, weapon, food, etc.) detection; object tracking (e.g., retail (tracking customer path in shopping stores, airport or train station shopping malls), smart transportation (tracking and regulating passenger or vehicle flow in airports, bus and train stations), security (monitor individuals for access control), safety (evacuating people in emergency situations)); and so forth. Other actions relating to a Face Recognition System, a surveillance system, and an action recognition system are also described herein below.

Figure 12:
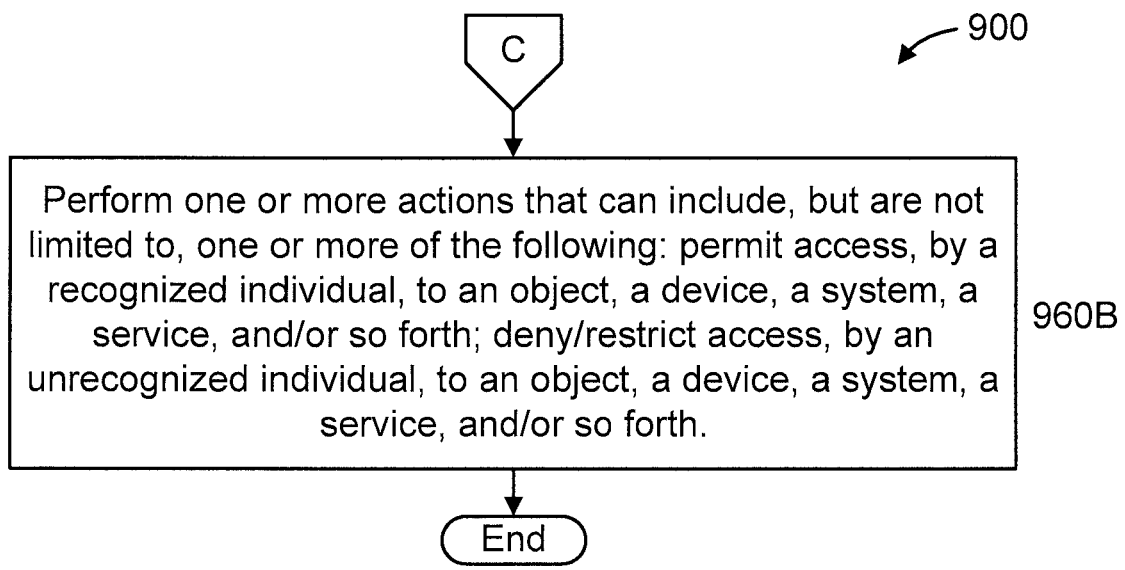

Referring to FIG. 12, at step 960B, corresponding to face recognition, perform one or more actions that can include, but are not limited to, one or more of the following: permit access, by a recognized individual, to an object, a device, a system, a service, and/or so forth; deny/restrict access, by an unrecognized individual, to an object, a device, a system, a service, and/or so forth. Such access can involve unlocking a lock, and so forth. Such access denial can involve locking a lock, and so forth.

Figure 13:
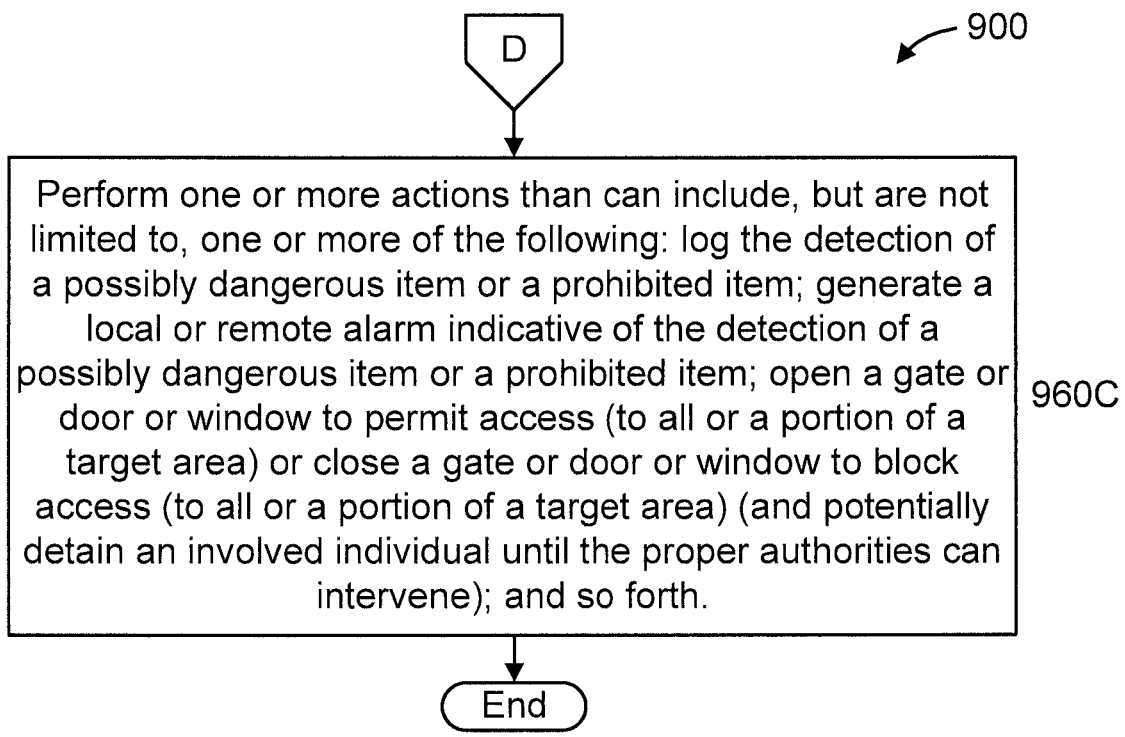

Referring to FIG. 13, at step 960C, corresponding to surveillance, perform one or more actions than can include, but are not limited to, one or more of the following: log the detection of a possibly dangerous item or a prohibited item; generate a local or remote alarm indicative of the detection of a possibly dangerous item or a prohibited item; open a gate or door or window to permit access (to all or a portion of a target area) or close a gate or door or window to block access (to all or a portion of a target area) (and potentially detain an involved individual until the proper authorities can intervene); and so forth.

Figure 14:
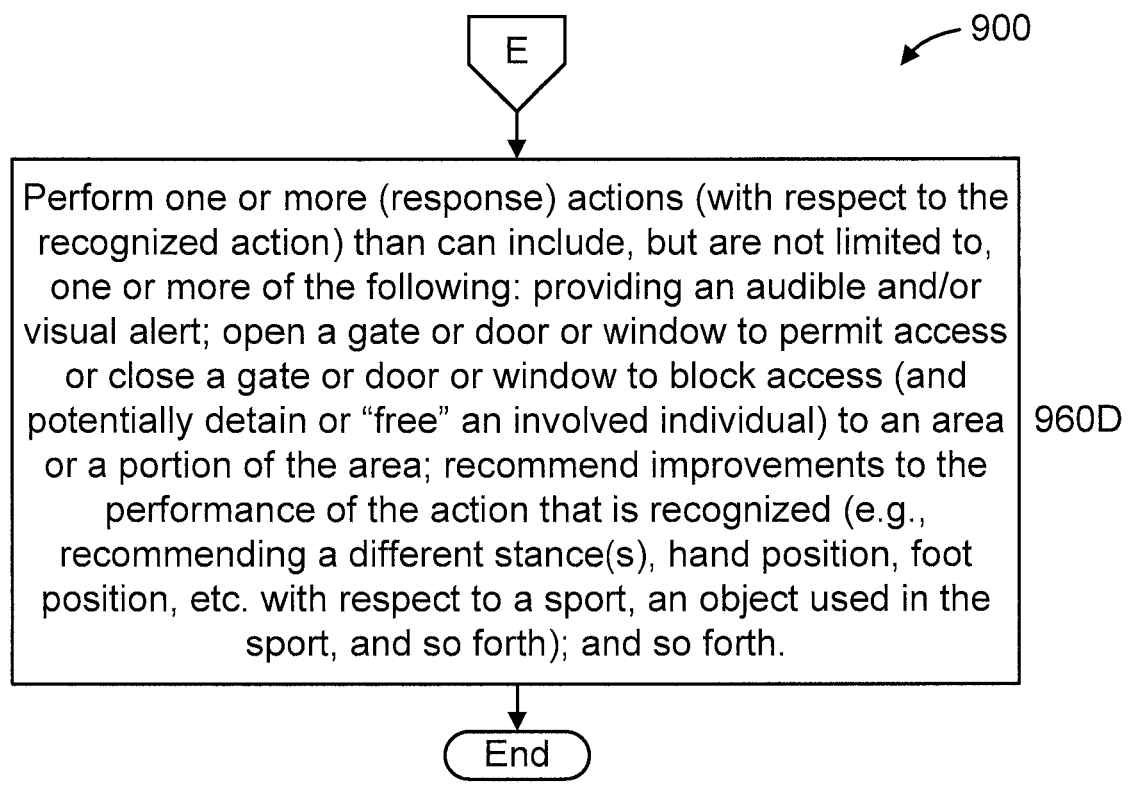

Referring to FIG. 14, at step 960D, corresponding to action recognition, perform one or more (response) actions (with respect to the recognized action) than can include, but are not limited to, one or more of the following: providing an audible and/or visual alert; open a gate or door or window to permit access or close a gate or door or window to block access (and potentially detain or "free" an involved individual) to an area or a portion of the area; recommend improvements to the performance of the action that is recognized (e.g., recommending a different stance(s), hand position, foot position, etc. with respect to a sport, an object used in the sport, and so forth); and so forth.

The system could apply a decision making process to, e.g., a list of objects determined by step 960A, in order to determine what type of action is being performed (in order to recognize the action) and what type of response action should be performed in response to the detected action type, based on object recognitions. The decision making process can be any known type of decision making process including, but not limited to, preprogrammed rules, a neural network, a decision tree, and so forth. It is to be appreciated that the preceding decision making processes are merely illustrative and, thus, other decision making processes can also be used in accordance with the teachings of the present invention, while maintaining the spirit of the present invention. Hence, the system could determine a person is performing a dangerous action (e.g., waiving a weapon (e.g., a knife, a firearm, etc.) and then secure the person within a target area or a region within a target area. The system could provide a user perceptible recommendation for a corrective action to the action performed by one or more users in order to optimize a performance of an action performed by the one or more users. The action can be a sports or any other type of action.

Regarding step 960 and its "sub-steps", the preceding actions mentioned with respect thereto are merely illustrative and, thus, other actions can also be performed in response to object detection and tracking results. As is evident to one of ordinary skill in the art, the action(s) taken is(are) dependent upon the type of application to which the present invention is applied.

A further description will now be given regarding various aspect of the present invention.

In an embodiment, the present invention provides an unsupervised framework that can successfully adapt the domain of video frames to images in the feature space without applying any identity label of videos. Numerous synthetic face images with degraded quality (e.g. through blurring, down-sampling and JPEG compression, etc.) are used to simulate the general quality degradation of video frames. Given a face recognition engine that is pre-trained on an image domain, and by taking the original and synthetic images, as well as random video frames as independent inputs, a new engine is adapted to the video domain in the following two ways. First, the representations of the synthetic degraded images are enforced on the new engine in order to be close to that of the original images on the pre-trained engine. Second, a discriminator with adversarial learning is adopted that dynamically encourages the video frames to have similar feature distributions with that of the images. Performance is improved through a quality attention module that rejects extremely low-quality frames.

In an embodiment, the present invention provides a data-driven method for image to video domain adaptation which can be used for video face recognition and other applications, as readily appreciated by one of ordinary skill in the art given the teachings of the present invention provided herein, while maintaining the spirit of the present invention. Instead of putting an effort towards collecting large-scale labeled video face database, the present invention utilizes large-scale unlabeled video data to reduce the gap between video and image domains while transferring discriminative knowledge from large-scale labeled still images. To this end, the present invention is configured to transfer discriminative knowledge by distilling the distance metric through feature matching from a reference network (RFNet) trained on a web face database to video face network (VDNet). Meanwhile, we maintain a set of domain specific data augmentations, such as motion blur, resolution variation, or video compression noise, on still images to train the VDNet to be able to restore the original representation of an image extracted from RFNet. By doing so, VDNet can learn robust representations to various types of noise processes that are potentially found in the real video data. Finally, a domain discriminator is introduced that learns to distinguish patterns in different domains and is used to regularize the VDNet to reduce domain difference as much as possible, without the requirement of any supervision such as instance-level correspondence between two domains or identity labels. Here, the augmented data, which can be considered either as a new domain different from both image and video or as part of the video domain, can be utilized in a synergistic way to help domain discriminator to discover domain differences effectively. Furthermore, once trained, the discriminator can tell which video frame looks like an image based on its confidence score. Discriminator-guided weighted feature fusion is introduced to highlight representations from more image-like frames while discounting representations from more video-like in contrast to high-quality web face images.

In summary, some of the more prevalent, but certainly not exhaustive contributions of the present invention are as follows:

We propose a feature-level domain adaptation to learn VDNet by distilling discriminative knowledge from a pre-trained RFNet through feature matching.

We propose to train with synthetic data augmentation for feature-level restoration as well as to help the discriminator to discover domain differences.

We propose a domain adversarial learning that modulates VDNet to learn a domain-invariant feature.

We illustrate how the confidence score of the discriminator can be used to develop an unsupervised feature fusion.

A description will now be given regarding domain adaptation from image to video, in accordance with an embodiment of the present invention.

While there are large amounts of unlabeled videos captured from different media sources, labeling a large-scale video database for face recognition requires much more effort than labeling a set of individual face images as it involves a complicated process of detection and tracking faces in random sequences. There are a few large-scale, still image based face databases collected from the web with identity labels. However, the face recognition engine trained on the high-quality web face database may not generalize well to the face recognition in videos as there exists a clear domain difference between images from a web face database and those from video frames as they include different types of noise from motion blur, camera out-of-focus blur, or compression. Herein, we introduce a set of objectives for our video face recognition network (VDNet) that can be trained on large-scale unlabeled video data in $\mathcal{V}$ while taking advantage of supervised information from labeled web face images in $\mathcal{I}$.

Figure 15:
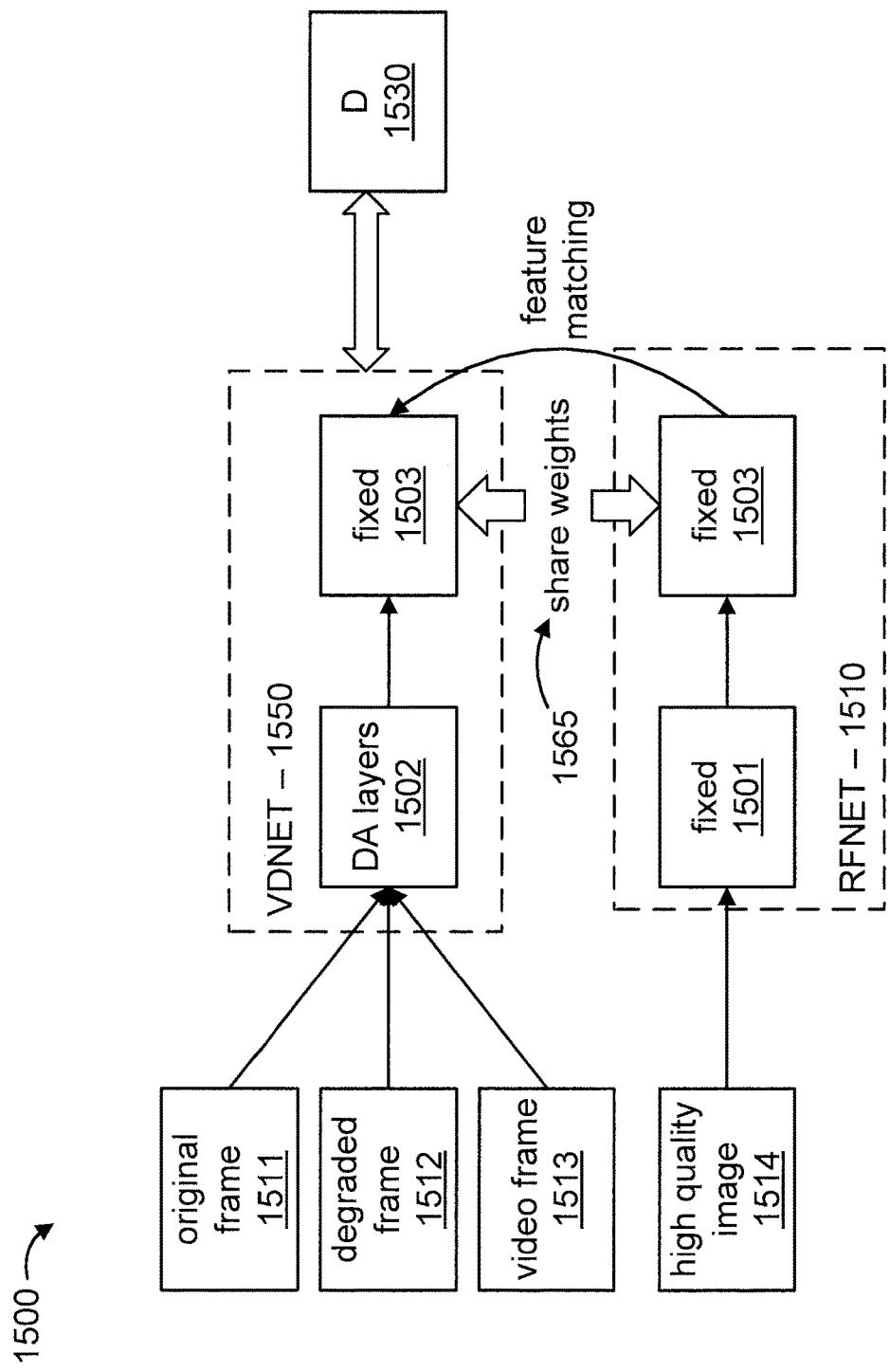
FIG. 15 shows an exemplary architecture, in accordance with an embodiment of the present invention.

FIG. 15 shows an exemplary architecture 1500, in accordance with an embodiment of the present invention. The architecture 1500 includes RFNet 1510 and VDNet 1550. The architecture 1500 applies a fixed, pre-trained face recognition engine 1501 in RFNet 1510, and the same network 1503 with partly unfreezing layers, the only part to learn, denoted as domain adaptation (DA) layers 1502 in VDNet 1550. VDNet 1550 and RFNet 1510 share weights 1565 there between. As input, in an embodiment, VDNet 1550 receives an original image 1511, a (synthetically) degraded image 1512, and a video frame 1513, while RFNet receives a high quality image 1514.

A description will now be given regarding distilling knowledge by featuring matching, in accordance with an embodiment of the present invention.

To take advantage of labeled training data from web face images, we train the VDNet 1550 by distilling discriminative knowledge from a pre-trained face recognition engine on a labeled web face database, which we call a reference network (RFNet) 1510. Different from previous work that exploits knowledge via the class probability, we distill information by matching feature representations between two networks. Let $\phi(\cdot): \mathbb{R}^D \to \mathbb{R}^K$ be a feature generation operator of VDNet 1550 and $\psi(\cdot): \mathbb{R}_D \to \mathbb{R}^K$ be that of RFNet 1510. The feature matching (FM) loss is defined on an image $x \in \mathcal{I}$ as follows:

$$\mathcal{L}_{FM} = \frac{1}{|\mathcal{I}|}\sum_{x \in \mathcal{I}} \|\phi(x) - \psi(x)\|_2^2 \tag{1}$$

Figure 16:
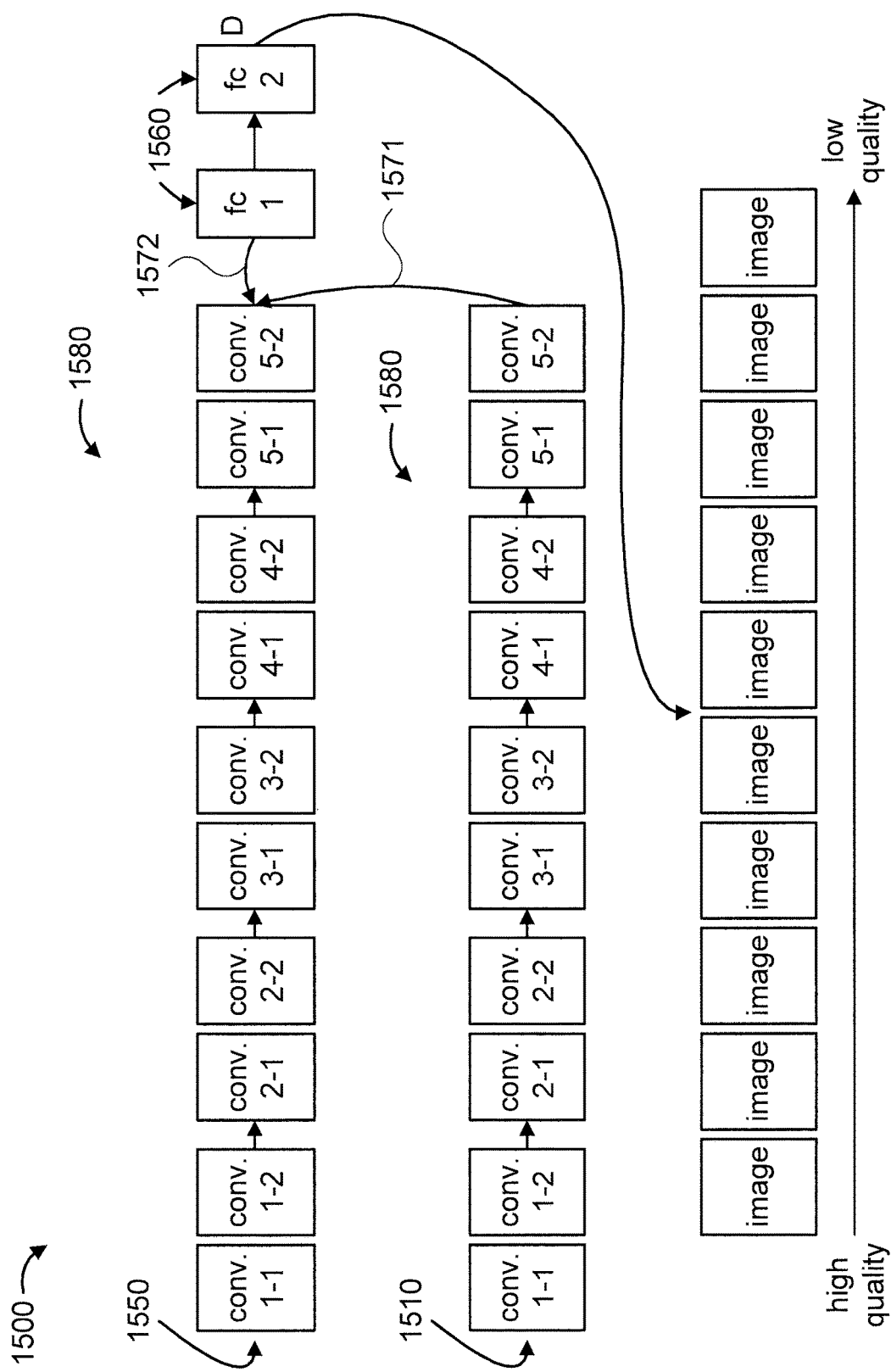
FIG. 16 further shows the architecture of FIG. 15, in accordance with an embodiment of the present invention.

The FM loss allows VDNet 1550 to maintain a certain degree of discriminative information (from a discriminator 1530) for face identity recognition. With regards to the network structure, VDNet 1550 can be very flexible as long as the matching feature has the same dimensionality to that of RFNet 1510. In practice, we use the same network architecture between VDNet 1550 and RFNet 1510. Moreover, we initialize the network parameters of VDNet 1550 with RFNet 1510 and freeze network parameters of few higher layers to further maintain discriminative information learned from labeled web face database, as illustrated in FIG. 16. That is, FIG. 16 further shows the architecture 1500 of FIG. 15, in accordance with an embodiment of the present invention. The architecture 1500 applies a fixed, pre-trained face recognition engine as RFNet 1510, and the same network of convolutional layers 1580 with partly unfreezing layers, the only part to learn, denoted as domain adaptation (DA) layers as VDNet 1550. The architecture 1500 involves feature matching 1571 and adversarial training 1572 to effectively adapt two domains. For VDNet 1550, three input sources from randomly selected face images and frames are adopted. No corresponding samples and identity labels are required.

A description will now be given regarding adaptation via synthetic data augmentation, in accordance with an embodiment of the present invention.

Data augmentation can be used for training very deep CNNs with limited amount of training data as it allows to prevent overfitting and thus enhance generalization ability of the networks. In addition to generic data transformation such as random cropping or horizontal flip, applying data transformation that is specific to target domain has shown to be effective. To generalize to video frames, we consider data augmentation by applying transformations such as linear motion blur, image resolution (scale) variation or video compression noise, which are the most typical causes of quality degradation in video, and train the VDNet 1550 to "restore" the original RFNet representation of an image without data augmentation through the feature restoration (FR) loss as follows:

$$\mathcal{L}_{FR} = \frac{1}{|I|} \sum_{x \in I} \mathbb{E}_{B(\cdot)}[\|\phi(B(x)) - \psi(x)\|_2^2] \qquad (2)$$

where $B(\cdot): \mathbb{R}^D \to \mathbb{R}^D$ is an image transformation kernel, and $\mathbb{E}_{B(\cdot)}$ is the expectation over the distribution of $B(\cdot)$. Herein, we consider three types of image transformations with the following parameters:

Linear motion blur: kernel length is randomly selected in (5, 15) and kernel angle is selected in (10, 30).
Scale variation: we rescale an image as small as ⅙ of the original image size.
JPEG compression: the quality parameter is set randomly in (30, 75).

These augmentations are applied in sequence to an image with probability of 0.5 for each noise process.

A description will now be given regarding adaptation via domain adversarial learning, in accordance with an embodiment of the present invention.

Although data augmentation has been successful in many computer vision applications, the types of transformation between source and target domains are not always known, i.e., there are many more unknown factors of variation between two domains. Moreover, modeling such transformations is challenging even if they are known, and we may need to resort to an approximation of those transformations in many cases. Thus it is difficult to close the gap between two domains. Rather than putting an effort to guess or approximate different types of transformations between two domains, we learn transformations between domains from the large-scale unlabeled data and facilitate the recognition engine to be robust to those transformations.

The idea of adversarial learning provides a good framework to solve the above problem, in which the (feature) generator, i.e., VDNet, is regularized to close the gap between two domains, where the domain difference is captured by the discriminator. Mathematically, the adversarial loss with two domains $\mathcal{X}$ and $\mathcal{V}$ is defined over the expectation of all training samples:

$$\mathcal{L}_D = -\mathbb{E}_x[\log D(y=1|\phi(x), x \in \mathcal{X}) - \log D(y=2|\phi(x), x \in \mathcal{V})] \qquad (3)$$

$$\mathcal{L}_{Adv} = -\mathbb{E}_x[\log Dy=1|\phi(x), x \in \mathcal{V}] \qquad (4)$$

The discriminator (D) is defined on top of VDNet that already induces highly abstract features from deep CNN and therefore D architecture can be very simple, such as two or three fully-connected layer networks 1560.

Note that adversarial loss allows to utilize large volume of unlabeled video data to train VDNet without any further labeling effort. However, the loss can only match representations between two domains in a global manner and the effect would be marginal if the contrast between two domains is small or the discriminator cannot distinguish them well. As a result, we may still want to take advantage of synthetic data augmentation with video-related transformations to guide discriminator either to realize the difference between domains easily or to figure out additional domain differences to known (approximated) transformations. This naturally leads us to two different discriminator types, one with a two-way classifier between image ($\mathcal{X}$) and synthesized image and video ($B(\mathcal{X}) \cup \mathcal{V}$) or the other with a three-way classifier among image, synthesized image, and video.

A description will now be given regarding a two-way classifier network, in accordance with an embodiment of the present invention.

The two-way classifier network uses a 2-way softmax classifier as D to discriminate between the image domain and the domain of synthesized image and video. While the original image are from the image domain, both synthetically degraded images as well as the random video frames are trained to belong to the same domain as follows:

$$\mathcal{L}_D = -\mathbb{E}_x[\log D(y=1|\phi(x), x \in \mathcal{X}) - \log D(y=2|\phi(x), x \in B(\mathcal{X}) \cup \mathcal{V})] \qquad (5)$$

$$\mathcal{L}_{Adv} = -\mathbb{E}_x[\log Dy=1|\phi(x), x \in B(\mathcal{X}) \cup \mathcal{V}] \qquad (6)$$

Since the contrast between two classes becomes apparent by including synthetic images for the second class, the transformations in the video domain that are similar to synthetic image transformations can be easily restored.

A description will now be given regarding a 3-way classifier network, in accordance with an embodiment of the present invention.

The 3-way classifier network uses a 3-way softmax classifier as D to discriminate the images, synthesized images, and video frames into three different categories.

$$\mathcal{L}_D = -\mathbb{E}_x[\log D(y=1|\phi(x), x \in \mathcal{X}) - \log D(y=2|\phi(x), x \in B(\mathcal{X})) - \log D(y=3|\phi(x), x \in \mathcal{V})] \qquad (7)$$

$$\mathcal{L}_{Adv} = -\mathbb{E}_x[\log D(y=1|\phi(x)), x \in B(\mathcal{X}) \cup \mathcal{V}] \qquad (8)$$

Unlike 2-way network, the 3-way network aims to distinguish video frames from not only an image domain but also synthetically degraded images. Therefore, it may not learn a VDNet with as strong restoration ability to synthetic transformations as with 2-way discriminator, but will try to find additional factors of variation between image or synthetic image and video domains.

The quality evaluation of each frame of videos is important for video face recognition since not all frames contribute equally. Moreover, when the frame is extremely noisy due to motion blur or other noise factors and is not recognizable, it is important to dis-count the contribution of those frames in order to highlight the contribution from more recognizable frames. Training with the domain contrast between image, blurred image and video, the discriminator is ready to provide a confidence score to each frame being a "high-quality web image" ($D(y=1|\phi(v))$) at test time, whose domain comes with a lot of labeled training examples to train a discriminative recognition engine. Finally, with an "imageness" score of the discriminator, the aggregated feature vector for a video V is represented as a weighted average of feature vectors as follows:

$$\phi_f = \frac{\sum_{v \in V} D(y=1|\phi(v)) \cdot \phi(v)}{\sum_{v \in V} D(y=1|\phi(v))} \qquad (9)$$

A description will now be given regarding a network implementation, in accordance with an embodiment of the present invention.

A description will now be given regarding a face recognition engine, in accordance with an embodiment of the present invention.

There has been a breakthrough in face recognition with the advancement of deep neural networks. Our face recognition engine is also based on deep CNNs trained on a large-scale web face database. The network architecture is composed of 10 layers of 3×3 convolution followed by ReLU nonlinearities with 4 max pooling layers with stride 2 and one average pooling layer with stride 7, except for that our network uses strided convolution to replace max pooling and maxout units for every other convolution layers instead of ReLU. The model is trained with a deep metric learning objective called N-pair loss. Different from contrastive loss or triplet loss, N-pair loss pushes (N−1) negative examples at the same time while pulling a single positive example, which allows to learn more discriminative representation. In an embodiment, N=1080 is used on 8 GPUs for training. Faces are detected and aligned using key points and 100× 100 grayscale image patches randomly cropped from 110× 110 resized face images are fed to network for training.

The RFNet is exactly the same as our face recognition engine and the parameters are fixed over the training. VDNet is initialized the same as RFNet but the parameters are updated for all layers except for the last two convolution layers, as illustrated in FIG. 16.

A description will now be given regarding a discriminator, in accordance with an embodiment of the present invention.

We apply a consistent network architecture of D for both two and three-way discriminators. In specific, D adopts a multiple layer perception (MLP) structure with two (320-160-3) or three (320-160-80-3) fully connected layers followed by ReLU at every layer except for the last fully-connected layer, as shown in FIG. 16. For two-way networks, we replace the output channel of last fully-connected layer from three to two.

A description will now be given regarding various aspects of the present invention that provide an improvement over the prior art and/or solve a deficiency of the prior art.

The present invention allows utilizing unlabeled data from a target domain for training of a recognition engine and thus better generalizes to the target domain.

The present invention achieves state-of-the-art video face recognition without direct supervision from video data.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An action recognition system, comprising:
a video capture device configured to capture a video sequence formed from a set of unlabeled testing video frames, the video sequence including one or more objects;
a processor configured to
pre-train a recognition engine formed from a reference set of convolutional neural networks (CNNs) on a still image domain that includes a set of labeled training still image frames;
adapt the recognition engine to a video domain to form an adapted recognition engine, by applying a non-reference set of CNNs to a set of domains that include the still image domain, a synthetically degraded image domain, and the video domain, wherein the synthetically degraded image domain includes labeled synthetically degraded versions of the labeled training still image frames included in the still image domain, and wherein the video domain includes random unlabeled training video frames;
recognize, using the adapted recognition engine, an action performed by at least one of the objects in the video sequence to obtain a set of recognized actions; and
control a hardware device to perform a response action in response to an identification of an action type of an action performed by the at least one object, wherein the identification of the action type is based on the set of recognized actions.

2. The action recognition system of claim 1, wherein the processor is further configured to modify, using a discriminator configured to perform adversarial learning, the random unlabeled training video frames in the video domain to have similar feature distributions to the labeled training still image frames in the still image domain.

3. The action recognition system of claim 2, wherein an output of the discriminator is applied on a feature space relating to the random unlabeled training video frames in the video domain.

4. The action recognition system of claim 2, wherein the discriminator is further configured to perform the adversarial learning using an adversarial loss metric.

5. The action recognition system of claim 2, wherein the discriminator is configured to use a 2-way softmax classifier to discriminate between the still image domain and an integrated domain formed from the video domain and the synthetically degraded image domain.

6. The action recognition system of claim 2, wherein the discriminator is configured to use a 3-way softmax classifier to discriminate between the still image domain, the video domain, and the synthetically degraded image domain.

7. The action recognition system of claim 2, wherein the discriminator is configured to assign a respective confidence score indicative of a degree of quality to each of the unlabeled testing video frames in the video sequence, and the processor is configured to reject any of the unlabeled testing video frames in the video sequence having the respective confidence score below a threshold value.

8. The action recognition system of claim 2, wherein the discriminator is implemented by a multi-layer perception structure with fully connected layers, each followed by a respective rectified linear unit.

9. The action recognition system of claim 1, wherein the set of domains further includes another still image domain that, in turn, includes random still image frames with respect to the still image domain and the synthetically degraded image domain.

10. The action recognition system of claim 1, wherein the synthetically degraded versions of image frames included in the still image domain, in turn, include blurred image frames and compressed image frames.

11. The action recognition system of claim 1, wherein the synthetically degraded versions of image frames included in the still image domain have been subjected to one or more transformations relative to the set of labeled training still image frames.

12. The action recognition system of claim 1, wherein pre-training of the recognition engine is performed by matching feature representations between the set of reference CNNs and the set of non-reference CNNs.

13. The action recognition system of claim 12, wherein matching feature representations comprises computing a feature matching loss for an image frame processed by the set of reference CNNs and the set of non-reference CNNs, and wherein discrimination information relating to object recognition is determined based on the feature matching loss.

14. The action recognition system of claim 1, wherein the processor is configured to adapt the recognition engine by training the recognition engine to restore an original representation of a still image frame without data augmentation based on a feature restoration loss.

15. The action recognition system of claim 1, wherein the response action comprises actuating a lock to secure the one or more objects within a given target area, responsive to the action type being associated with a potential danger.

16. The action recognition system of claim 1, wherein the response action comprises logging a detection of the at least one object as posing a potential danger and generating a remote alarm indicative of the detection, responsive to the action type being associated with a potential danger.

17. The action recognition system of claim 1, wherein the at least one object comprises at least one user, and wherein the response action comprises providing a user perceptible recommendation for a corrective action to the action performed by the at least one user in order to optimize a performance of the action performed by the at least one user.

18. A computer-implemented method for action recognition, comprising:
  capturing, by a video capture device, a video sequence formed from a set of unlabeled testing video frames, the video sequence including one or more objects;
  pre-training, by a processor, a recognition engine formed from a reference set of convolutional neural networks (CNNs) on a still image domain that includes a set of labeled training still image frames;
  adapting, by the processor, the recognition engine to a video domain to form an adapted recognition engine, by applying a non-reference set of CNNs to a set of domains that include the still image domain, a synthetically degraded image domain, and the video domain, wherein the synthetically degraded image domain includes labeled synthetically degraded versions of the labeled training still image frames included in the still image domain, and wherein the video domain includes random unlabeled training video frames;
  recognizing, by the processor using the adapted recognition engine, an action performed by at least one of the objects in the video sequence to obtain a set of recognized actions; and
  controlling, by the processor, a hardware device to perform a response action in response to an identification of an action type of an action performed by the at least one object, wherein the identification of the action type is based on the set of recognized actions.

19. The computer-implemented method of claim 18, wherein the processor is further configured to modify, using a discriminator configured to perform adversarial learning, the random unlabeled training video frames in the video domain to have similar feature distributions to the labeled training still image frames in the still image domain.

20. A computer program product for action recognition, the computer program product comprising a non-transitory computer readable storage medium having program instructions embodied therewith, the program instructions executable by a computer to cause the computer to perform a method comprising:
  capturing, by a video capture device, a video sequence formed from a set of unlabeled testing video frames, the video sequence including one or more objects;
  pre-training, by a processor, a recognition engine formed from a reference set of convolutional neural networks (CNNs) on a still image domain that includes a set of labeled training still image frames;
  adapting, by the processor, the recognition engine to a video domain to form an adapted recognition engine, by applying a non-reference set of CNNs to a set of domains that include the still image domain, a synthetically degraded image domain, and the video domain, wherein the synthetically degraded image domain includes labeled synthetically degraded versions of the labeled training still image frames included in the still image domain, and wherein the video domain includes random unlabeled training video frames;

recognizing, by the processor using the adapted recognition engine, an action performed by at least one of the objects in the video sequence to obtain a set of recognized actions; and controlling, by the processor, a hardware device to perform a response action in response to an identification of an action type of an action performed by the at least one object, wherein the identification of the action type is based on the set of recognized actions.

* * * * *